United States Patent [19]
Nobumoto et al.

[11] Patent Number: 6,063,002
[45] Date of Patent: May 16, 2000

[54] CONTROL SYSTEM FOR A CONTINUOUSLY VARIABLE TRANSMISSION

[75] Inventors: Hidetoshi Nobumoto; Hisanori Nakane, both of Hiroshima, Japan

[73] Assignee: Mazda Motor Corporation, Hiroshima, Japan

[21] Appl. No.: 09/139,667

[22] Filed: Aug. 25, 1998

[30] Foreign Application Priority Data

Aug. 25, 1997 [JP] Japan ................................. 9-244664

[51] Int. Cl.⁷ ................................................. F16H 61/38
[52] U.S. Cl. ................................................. 477/41
[58] Field of Search ..................................... 477/41

[56] References Cited

U.S. PATENT DOCUMENTS

| | | |
|---|---|---|
| 4,464,952 | 8/1984 | Stubbs . |
| 5,103,693 | 4/1992 | Hibi .......................................... 477/41 |
| 5,157,993 | 10/1992 | Abo .......................................... 477/41 |
| 5,213,011 | 5/1993 | Nobumoto et al. ......................... 477/41 |
| 5,319,999 | 6/1994 | Morishige et al. . |

FOREIGN PATENT DOCUMENTS

| | | |
|---|---|---|
| 0386746 | 9/1990 | European Pat. Off. . |
| 3-223555 | 10/1991 | Japan . |
| 6-101754 | 4/1994 | Japan . |
| 1603853 | 12/1981 | United Kingdom . |

Primary Examiner—Dirk Wright
Attorney, Agent, or Firm—Nixon Peabody LLP; Donald R. Studebaker

[57] ABSTRACT

A control system for a continuously variable transmission continuously varies a gear ratio according to predetermined control patterns specified according to engine speeds and loadings, each predetermined control pattern including two separate sections, one of which is used only during acceleration of the vehicle and another of which is used only during deceleration of the vehicle, for a specified band of vehicle speeds within which a specific vehicle speed at which power transmission paths are switched over from one to another.

9 Claims, 20 Drawing Sheets

CONTROL SYSTEM FOR A CONTINUOUSLY VARIABLE TRANSMISSION

BACKGROUND OF THE INVENTION

1. Field of the Invention

The invention relates to a control system for a continuously variable transmission, and more particularly, to a control system for a continuously variable transmission of a type having a plurality of power transmission paths selectively used according to vehicle running conditions.

2. Description of the Related Art

There have been known various continuously variable transmissions such as belt type continuously variable transmissions and toroidal type continuously variable transmissions for automobile vehicles which continuously vary a gear ratio between an input speed from an engine and an output speed to drive wheels to attain an engine speed determined according to vehicle running conditions including a vehicle speed and throttle opening. Such a toroidal type continuously variable transmission has a toroidal continuously variable gear mechanism which is comprised of input and output toroidal disks and rollers interposed between these input and output toroidal disks. The toroidal type of continuously variable transmission continuously varies the gear ratio according to inclinations of the roller of the toroidal continuously variable gear mechanism. One of the toroidal type continuously variable transmissions is known from, for example, Japanese Unexamined Patent Publications Nos. 3-223555 and 6-101754. It has been known that what is called a geared neutral starting system is employed in the continuously variable transmission regardless of belt type or toroidal type. In such a continuously variable transmission equipped with the geared neutral starting system, the toroidal continuously variable gear mechanism is mounted on a transmission input shaft connected to the engine, and a planetary gear set is mounted on a secondary shaft disposed in parallel to the input shaft. The planetary gear set is comprised of three rotary elements, namely a sun gear, an internal gear and a pinion carrier supporting pinions meshed with the sun gear and the internal gear. One of these rotary elements, i.e. the internal gear, is used as an transmission output gear. Rotation of engine is imparted to the planetary gear set partly directly through the pinion carrier and partly through the sun gear via the toroidal continuously variable gear mechanism.

The ratio of rotation between the pinion carrier and the sun gear is varied by controlling the gear ratio of the toroidal continuously variable gear mechanism so as to hold the transmission output element, i.e. the sin gear, remaining stand still, providing a neutral condition. By increasingly or decreasingly varying the gear ratio of the toroidal continuously variable gear mechanism causes the internal gear as the transmission output element to rotate in a forward direction or in a reverse direction. This type of continuously variable transmission permits the vehicle to start forward or back without use of a clutch and/or torque converter, which yields improvement of responsibility and power transmission efficiency of the continuously variable transmission.

The toroidal continuously variable gear mechanism is controlled to vary its gear ratio so as to gain a resultant transmission gear ratio or to provide a target engine speed which is determined on a control map specifying gear ratio change patterns according to vehicle running conditions including vehicle speeds and throttle positions. As is known in the art the gear ratio of the toroidal continuously variable mechanism is varied by controlling angles of inclination of the roller with respect to the toroidal surfaces of the input and output disks. However, since gear ratios and inclinations of the rollers of the toroidal continuously variable mechanism are fixedly correlated to each other, if inclining the roller all the way in one direction to attain an aimed desired gear ratio, the roller must be put at great angles of inclination with respect to the input and output disks to attain some aimed gear ratios, which causes a decline in power transmission efficiency of the continuously variable transmission.

It has been known to provide the continuously variable transmission in which power transmission paths for transmitting engine output power to drive wheels are changed from one to another according to vehicle running conditions to reverse the correlation between gear ratios and inclinations of the rollers of the toroidal continuously variable mechanism. The continuously variable transmission of this kind remains inclinations of the roller within specified limits of angle for all desired gear ratios. In order for the continuously variable transmission to establish a geared neutral condition, two power transmission paths are organized such that a first power transmission path transmits engine output power to the drive wheels via a toroidal continuously variable mechanism and a planetary gear mechanism to reduce the resultant gear ratio as the toroidal continuously variable mechanism increases its gear ratio in forward speed ranges and a second power transmission path transmits engine output power to the drive wheels via the toroidal continuously variable mechanism only to reduce its gear ratio as the toroidal continuously variable mechanism reduces its gear ratio. Considering a case of reducing the gear ratio of the continuously variable transmission following an increase in vehicle speed by way of example, the roller is inclined in a direction in which the toroidal continuously variable mechanism increases its gear ratio (this control of gear ratio is referred to as a low mode gear ratio control) after putting the continuously variable transmission in the first transmission path from the geared neutral position and subsequently in an opposite direction in which the toroidal continuously variable mechanism reduces its gear ratio (this control of gear ratio is referred to as a high mode gear ratio control) after putting the continuously variable transmission in the second transmission path. Accordingly, the toroidal continuously variable mechanism maintains inclinations of the roller within the specified limits of angle, preventing the continuously variable transmission from causing a drop in power transmission efficiency.

If changing the continuously variable transmission between the first and second power transmission paths when there is a difference in resultant gear ratio between the low gear ratio control mode in which the first power transmission is used and a high gear ratio control mode in which the second power transmission path is used, a steep change in gear ratio of the toroidal continuously variable mechanism as great as the passengers feel a shift shock occurs. For this reason, changing the continuously variable transmission between the low and high gear ratio control modes must be timely made at a point where the resultant gear ratio continuously varies between the low and high gear ratio control modes, i.e. the resultant gear ratios of the continuously variable transmission in the low and high gear ratio control modes are identical with each other. Accordingly, this point is a characteristic point determined based on vehicle speeds and throttle openings and lies on a gear ratio control line set forth for each specific throttle opening. When connecting the points on the gear ratio control lines set forth for specific throttle openings by a line, this line forms a mode switch line, an inclination angle of the line indicating the same resultant gear ratio described above.

When the vehicle changes its speed crossing the mode switch line, the continuously variable transmission changes the gear ratio control modes or the power transmission paths from one to another. When the vehicle enters a slope repeatedly sloping up and down with an accelerator pedal remaining fixedly stepped on, i.e. with an throttle remaining open to a fixed position, the vehicle changes its speed according to the up and down slopes. If the vehicle speed changes repeatedly crossing the switch point, the continuously variable transmission switches the power transmission paths frequently, which always cause hunting of a switch of power transmission paths. Further, since the driver does not changes an accelerator pedal position, the driver feels shocks accompanying switches of the power transmission paths. This problem is common to continuously variable transmissions which selectively uses a plurality of power transmission paths.

SUMMARY OF THE INVENTION

It is an objective of the invention to provide a control system for a continuously variable transmission of a type having a plurality of power transmission paths used selectively which is prevented or significantly reduced from causing hunting of switching the power transmission paths which is accompanied by shocks.

The foregoing object of the present invention is achieved by providing a control system for a continuously variable transmission disposed between an engine and drive wheels which incorporating a continuously variable gear mechanism which continuously varies a gear ratio between an input speed from the engine and an output speed to the drive wheels of a vehicle according to gear ratio control patterns predetermined based on vehicle running conditions including a vehicle speed and engine loading and is switchable between a plurality of power transmission paths for transmitting engine output torque to the drive wheels, at least one of the power transmission paths including the continuously variable gear mechanism, selectively built up according to switching characteristics predetermined based on vehicle running conditions. The continuously variable transmission control system actuates switching means, such as friction coupling clutches, to selectively switch over the power transmission paths from one to another according to the predetermined switching characteristics based on vehicle running conditions, and controlling the continuously variable gear mechanism according to the predetermined gear ratio control pattern selected based on vehicle running conditions. Each predetermined gear ratio control pattern being partly divided into two separate sections, one of which is used only during acceleration of the vehicle and another of which is used only during deceleration of the vehicle.

The continuously variable gear mechanism may be of a toroidal type of continuously variable mechanism which is comprised of an input toroidal disk, an output toroidal disk and a roller disposed between the input and output toroidal disks and capable of inclining relative to the input and output toroidal disks and continuously varies a gear ratio between an input speed to the input toroidal disk from the engine and an output speed to the drive wheels from the output toroidal disk according to inclinations of the roller.

The separate sections of the gear ratio control pattern are provided for a specified band of vehicle speeds including a specific vehicle speed at which the continuously variable transmission is switched between two different power transmission paths. The continuously variable transmission control system switches the continuously variable transmission from gear ratio control according to one section of a gear ratio control pattern to gear ratio control according to another section of the gear ratio control pattern when vehicle running condition turns from acceleration to deceleration or vice versa and maintains a gear ratio at the beginning of the switch of gear ratio control until the switch of gear ratio control is completed.

The continuously variable transmission may built up simultaneously two power transmission paths, first one of which includes the continuously variable gear mechanism and another of which is free from the continuously variable gear mechanism in the neutral position. That is, in the neutral position, the continuously variable gear mechanism is controlled to provide an output speed through the first power transmission path such as to cancel an output speed through the other power transmission path.

According to the control system for the continuously variable transmission incorporating a continuously variable gear mechanism of the invention, the continuously variable transmission is controlled to switch between two power transmission paths, one of which includes continuously variable gear mechanism and another of which is free from the continuously variable gear mechanism, according to a predetermined control pattern based on vehicle running conditions including at least a vehicle speed, and the continuously variable gear mechanism is controlled to continuously vary a gear ratio according to predetermined control patterns based on vehicle running conditions including at least a vehicle speed and engine loading. The gear ratio control pattern for each specified engine loading or throttle opening is partly divided into two separate sections, one section being used only during acceleration of the vehicle and another section being used only during deceleration of the vehicle. Whenever the vehicle turns between acceleration and deceleration, the continuously variable gear mechanism is controlled to vary a gear ratio according to different control patterns predetermined suitably for accelerating condition and decelerating condition, so that there is no hunting of switching the power transmission paths of the continuously variable transmission from one to another which is accompanied by shocks.

For example, when the vehicle turns from acceleration to deceleration due to sloping up of a road while the accelerator pedal remains stepped on to a fixed position, there occurs a switch of control pattern of the continuously variable gear mechanism from the control pattern proper to acceleration to the control pattern proper to deceleration. Because the vehicle speed is not change immediately before and after the switch of control pattern, there is provided a prolonged period of time between a switch of power transmission paths caused when the vehicle speed exceeds a switchover speed on the acceleration section of control pattern during acceleration and a switch of power transmission paths caused when the vehicle speed exceeds a switchover speed on the deceleration section of control pattern during deceleration by establishing the gear ratio control pattern such that a difference of a target vehicle speed controlled according to the deceleration section of control pattern from a current vehicle speed is greater than a difference of a target vehicle speed controlled according to the acceleration section of control pattern from the current vehicle speed

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
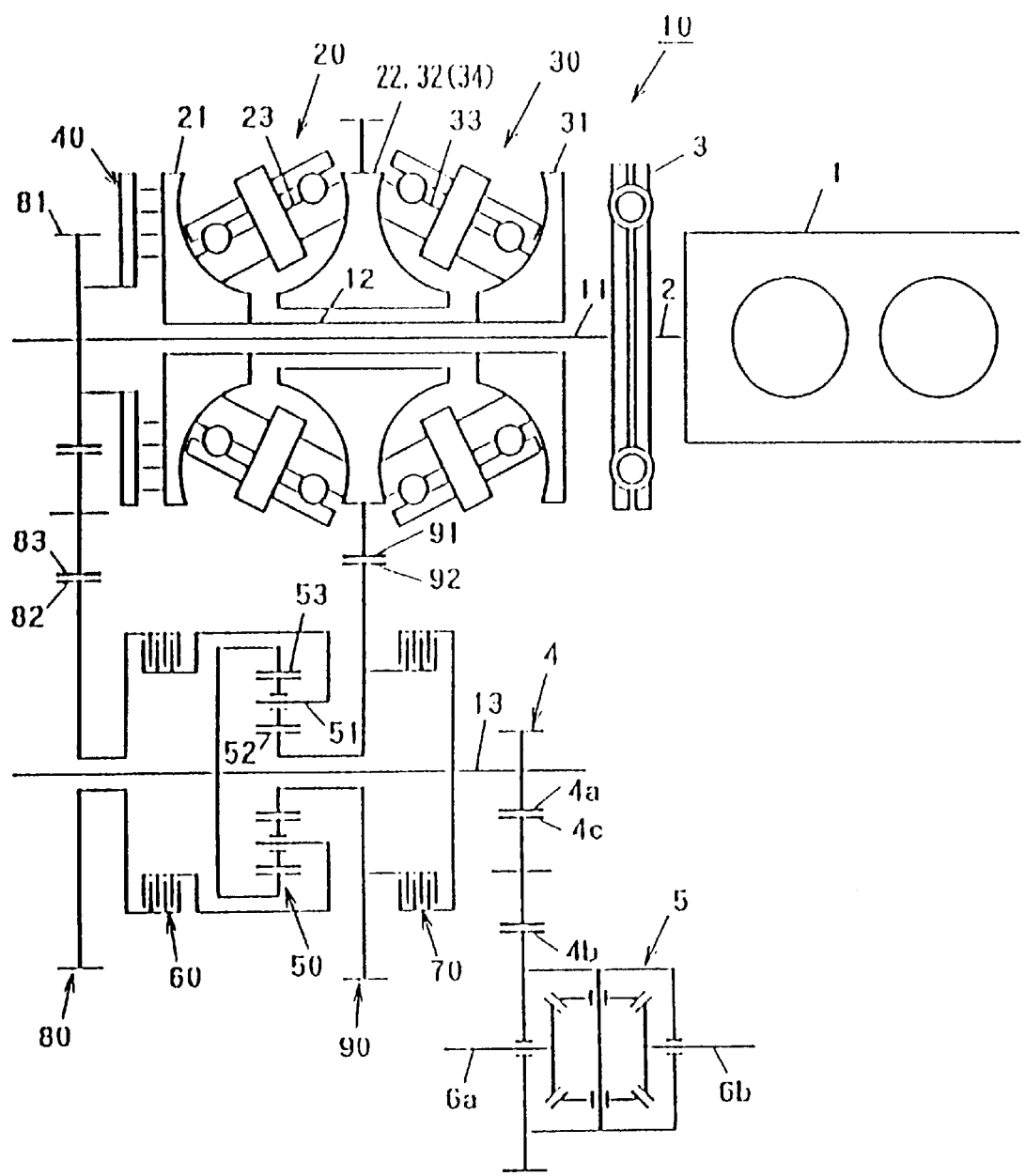
FIG. 1 is a skeleton view of a toroidal type continuously variable transmission controlled by a control system in accordance with an embodiment of the invention.

Referring to the drawings in detail and, in particular, to FIG. 1 showing a toroidal type continuously variable transmission (CVT) 10 with a control system in accordance with an embodiment of the invention, the continuously variable transmission 10 has three shafts, namely an input shaft 11 connected to an output shaft 2 of an engine 1 through a torsional damper 3, a hollow primary shaft 12 in which the output shaft 11 is coaxially disposed and a secondary shaft 13 disposed in parallel to the primary shaft 12. These transmission shafts 11–13 extend transversely in the vehicle body. The primary shaft 12 mounts thereon a first or rear and a second or front toroidal continuously variable gear mechanism 20 and 30 in order from a side remote from the engine 1 and a loading cam 40. The secondary shaft 13 mounts thereon a planetary gear set 50 and two clutches, namely a low mode clutch 60 and a high mode clutch 70. There are low and high mode gear trains 80 and 90 between input shaft 11 and the secondary shaft 13. The first and second toroidal continuously variable gear mechanisms 20 and 30 have the same mechanism. Each toroidal continuously variable gear mechanism 20, 30 comprises an input disk 21, 31, an output disk 22, 32 and a pair of first and second roller 23, 33 between the input and output surfaces to transmit driving power from one to another. The input disks 21 and 31 are mounted on the primary shaft 12 by means of spline-engagement. The output disks 22 and 32 are formed integrally as one whole, which is hereafter referred to as an integrated output disk 34.

First toroidal continuously variable gear mechanism 20 is placed to direct the face of the input disk 21 toward the engine 1, and, however, the second toroidal continuously variable gear mechanism 30 is placed to direct the face of the output disk 32 toward the engine 1. The input disks 21 and 31 of the first and second toroidal continuously variable gear mechanisms 20 and 30 are fixedly mounted to opposite ends of the primary shaft 12, respectively, and the output disks 22 and 32 of the first and second toroidal continuously variable gear mechanisms 20 and 30 are mounted for rotation on the primary shaft 12.

The input shaft 11 is provided with a low mode first gear 81 forming a part of the low mode gear train 80 secured to one end thereof remote from the engine 1 and the loading cam 40 between the low mode first gear 81 and the first toroidal continuously variable gear mechanism 20. The integrated output disk 34 is provided with an peripheral first high mode gear 91 forming a part of the high mode gear train 90. The secondary shaft 13 mounts thereon for rotation a low mode second gear 82 forming a part of the low mode gear train 80 and a high mode second gear 92 for forming a part of the high mode gear train 90. These first and second low mode gears 81 and 82 of the low mode gear train 80 are connected through a high mode idle gear 83, and similarly, these high mode first and second gears 91 and 92 of the high mode gear train 90 are connected through a high mode idle gear 93. The secondary shaft 13 mounts thereon the planetary gear set 50 having a sun gear 52 meshed with the high mode second gear 92 and an internal gear 53 secured to the secondary shaft 13. The high mode clutch 70 is placed adjacent to the high mode second gear 92 to connect the high mode second gear 92 to the secondary shaft 13 and disconnect the high mode second gear 92 from the secondary shaft 13. The secondary shaft 13 at one of its end is connected to a differential 5 by means of an output gear train 4 comprising first and second gears 4a and 4b. Driving power is transmitted to right and left wheel drive axles 6a and 6b through the differential 5.

As was previously described, because the toroidal continuously variable gear mechanisms 20 and 30 have the same mechanism, the following description is directed to the toroidal continuously variable gear mechanism 20 only.

Figure 2:
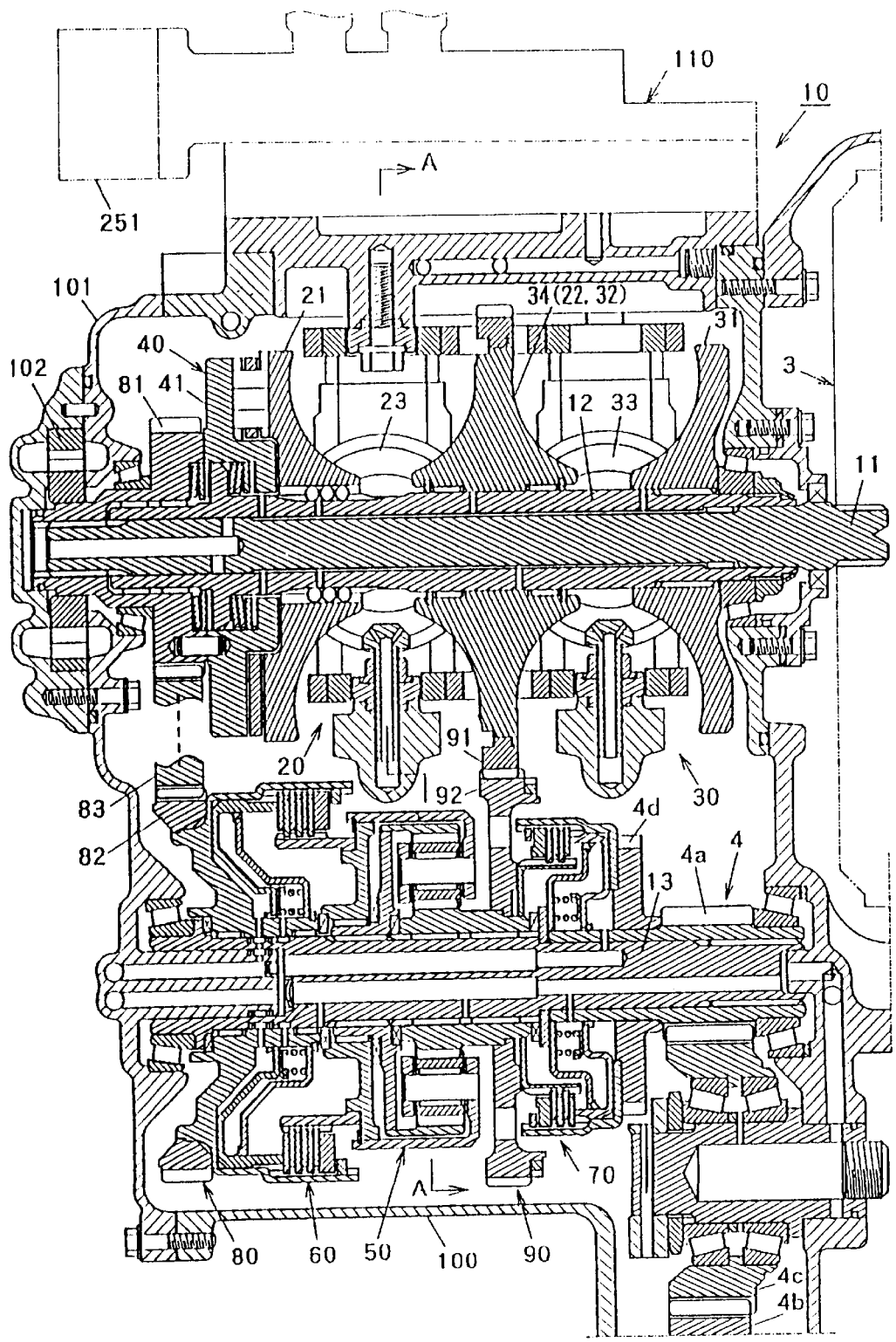
FIG. 2 is an expanded cross-sectional view of an essential part of the toroidal type continuously variable transmission.
Figure 3:
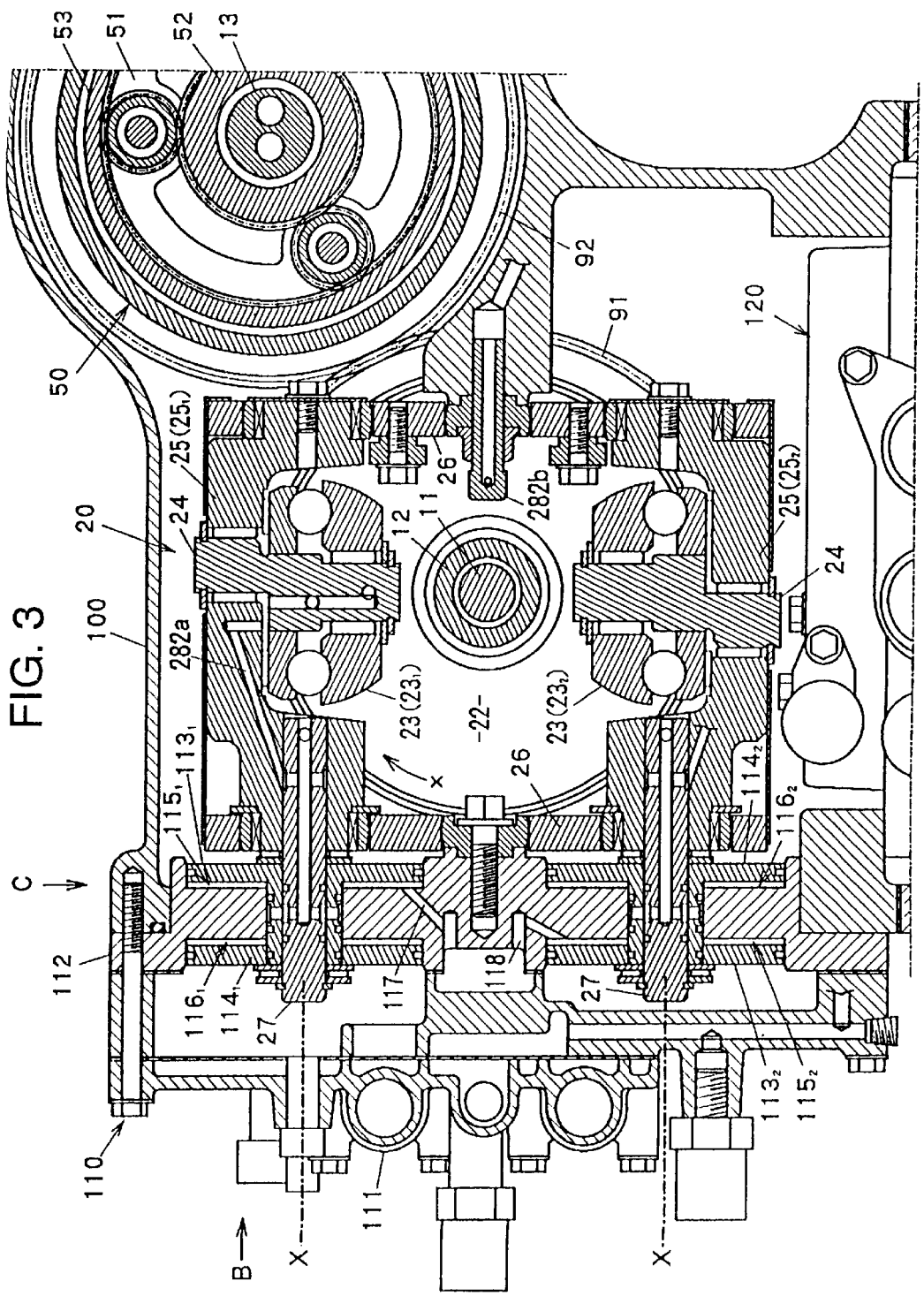
FIG. 3 is a cross-sectional view of FIG. 2 taken along line A—A.

Referring to FIGS. 2 and 3 in detail, each roller 22, 23 is supported by a trunnion 25 through a shaft 24 radially extending. The roller 22, 23 at its both ends is in contact with the opposite toroidal surfaces of the input and output disks 21 and 22. The first and second rollers 22 and 23 are placed in the same plane passing the center axis of rotation of the input shaft 12 and on opposite sides of the center axis of rotation of the input shaft 12. The trunnion 25 is held at axially opposite sides by supports 26 so as to rotate about a horizontal axis X tangential to the toroidal surface and perpendicular to the shafts 24 and to move back and forth along the axis X. The trunnion 25 is provided with a trunnion rod 27 extending in a direction of the axis X. The roller 23 is rolled by means of a speed change control unit 110 secured to the transmission housing 100 through the trunnion 25 and trunnion rod 27.

The speed change control unit 110 includes a hydraulic control section 111 and a trunnion drive section 112. The trunnion drive section 112 includes a piston $113_1$ and a piston $114_1$ both of which are attached to the rod 27 for the first roller $23_1$ and a piston $113_2$ and a piston $114_2$ both of which are attached to the rod 27 for the second roller $23_2$. Hydraulic pressure chambers $115_1$ and $116_1$ are formed facing to the first piston $113_1$ and the first piston $114_1$, respectively, and similarly, hydraulic pressure chambers $115_2$ and $116_2$ are formed facing to the second piston $113_2$ and the second piston $114_2$, respectively. The hydraulic pressure chamber $115_1$ for the first piston $113_1$ is placed close to the first roller $23_1$ and the hydraulic pressure chamber $116_1$ for the first piston $113_1$ is placed far from the first roller $23_1$. On the other hand, the hydraulic pressure chamber $116_2$ for the second piston $113_2$ is placed close to the second roller $23_2$ and the hydraulic pressure chamber $115_2$ for the second piston $113_2$ is placed far from the first roller $23_1$. Hydraulic pressure provided by the hydraulic control section 111 is delivered into the hydraulic pressure chambers $115_1$ and $115_2$ through oil paths 117 and 118, respectively, for and into the hydraulic pressure chambers $115_1$ and $116_2$ through oil paths (not shown).

In hydraulic pressure delivery control for the toroidal continuously variable gear mechanism 20 by way of example, when the hydraulic pressure $P_H$ in the first and second hydraulic pressure chambers $115_1$ and $115_2$ becomes higher than a neutral level and relatively to the hydraulic pressure $P_L$ in the first and second reduction hydraulic pressure chambers $116_1$ and $116_2$, the first trunnion $25_1$ is forced to move horizontally toward the right as viewed in FIG. 3 and the second trunnion $25_2$ is forced toward the left. If the output disk 22 is rotating in a clockwise direction as viewed in FIG. 3, the first roller $23_1$ receives downward force from the output disk 22 and upward force from the input disk 21 rotating in a counterclockwise direction during moving toward the right, and conversely the second roller $23_2$ receives upward force from the output disk 22 and downward force from the input disk 21 during moving toward the left. As a result, both rollers $23_1$ and $23_2$ incline so as to shift their contact points with toroidal surfaces of the input disk 21 radially outward and their contact points with toroidal surfaces of the output disk 22 radially inward, thereby lowering a gear ratio of the toroidal continuously variable gear mechanism 20. On the other hand, when the hydraulic pressure $P_L$ in the first and second reduction hydraulic pressure chambers $116_1$ and $116_2$ becomes higher than a neutral level and relatively to the hydraulic pressure $P_H$ in the first and second speed increase pressure chambers $115_1$ and $115_2$, the first trunnion $25_1$ is forced to move horizontally toward the left as viewed in FIG. 3 and the second trunnion $25_2$ is forced toward the right. At this time, when the output disk 22 rotates in the direction X, the first roller $23_1$ receives upward force from the output disk 22 and downward force from the input disk 21 during moving toward the left, and the second roller $23_2$ receives downward force from the output disk 22 and upward force from the input disk 21 during moving toward the left. As a result, both rollers $23_1$ and $23_2$ incline so as to shift their contact points with toroidal surfaces of the input disk 21 radially inward and their contact points with toroidal surfaces of the output disk 22 radially outward, thereby changing the toroidal continuously variable gear mechanism 20 to a higher gear ratio. Controlling of the hydraulic pressure $P_H$ or $P_L$ will be described in detail later with reference to a hydraulic control circuit 200 shown in FIG. 10.

Operation of the toroidal continuously variable gear mechanism 30 occurs in the same way as described above regarding the toroidal continuously variable gear mechanism 20.

Because the splined input disks 21 and 22 are placed on opposite splined ends of the primary shaft 12, respectively, and the output disks 22 and 32 are integrated, the first and second toroidal continuously variable gear mechanisms 20 and 30 always have same input speed and output speed, and provide always the same gear ratio.

Figure 4:
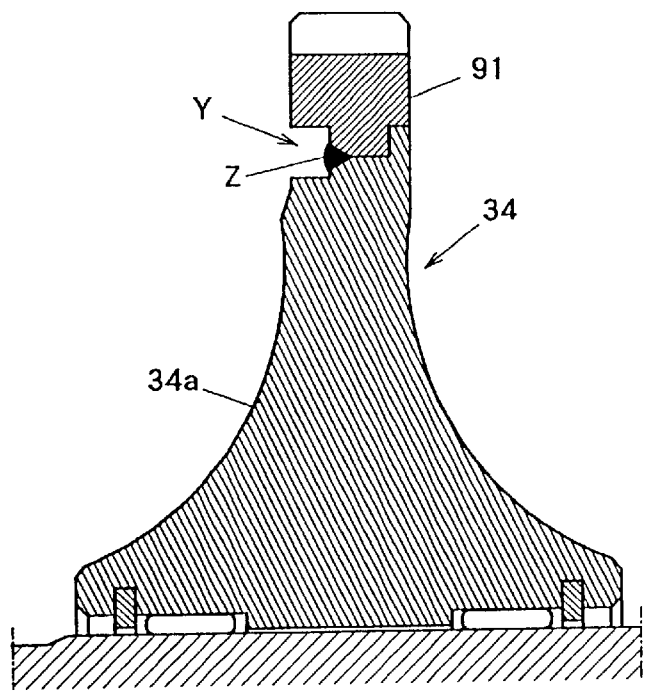
FIG. 4 is an explanatory view showing installation of a first gear forming a high mode gear train.
Figure 5:
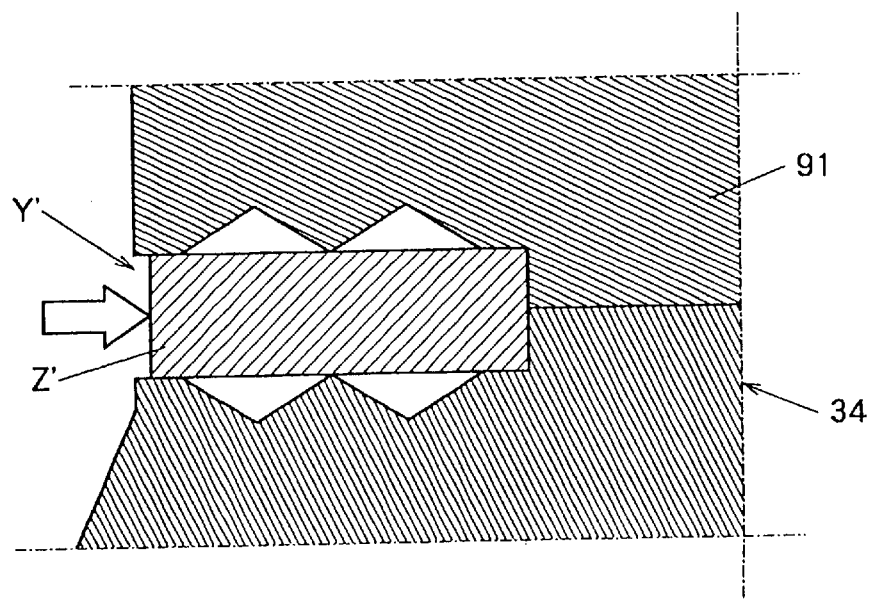
FIG. 5 is an explanatory view showing a variation of installation of the first gear forming the high mode gear train.

As shown in FIG. 4, the integrated output disk 34 is provided with the high mode first ring gear 91 welded to the outer wall of the integrated output disk 34. The integrated output disk 34 and the first high mode gear 91 are formed with annular mating shoulders to provide an annular recess Y for welding. That is, a welding portion is separated from one of the toroidal surfaces, namely the toroidal surface 34a, of the integrated output disk 34. This annular recess Y prevents the roller 23 from interfering with weld metal padding Z. Welding the high mode first ring gear 91 to the outer wall of the integrated output disk 34 prevents the high mode first ring gear 91 from axially rattling. In this instance, the high mode first ring gear 91 is formed of a low hardness material, and the integrated output disk 34 is made of a high hardness material. Accordingly, while the high mode first ring gear 91 is prevented from breakage of teeth because of tough engagement with the high mode second gear 92 meshed with the sun 52 of the planetary gear set 50, the integrated output disk 34 is prevented from plastic deformation due to frictional contact with the roller 23. In order to provide a difference in hardness between the high mode first ring gear 91 and the integrated output disk 34, it is effective to form effective case depth hardened by carburized treatment on them. Specifically, the integrated output disk 34 has a carburized case depth greater than the high mode first ring gear 91. Even in this case, a welding portion is separated from the toroidal surface 34a of the integrated output disk 34, so that the weld metal padding Z is isolated from the carburized surface of the integrated output disk 34 by virtue of the annular recess Y. Further, the high mode first ring gear 91 may be united with the integrated output disk 34 together by plastic deformation in place of welding. For example, as shown in FIG. 5, each of the high mode first ring gear 91 and the integrated output disk 34 are formed with mating halves of a counter bore Y'. A connecting ring Z' made of a soft iron material is press-fitted into the counter bore Y' finished by knurling. By this way, the connecting ring Z' is plastic deformed to fill flutes of the counter bore Y', as a result of which the high mode first ring gear 91 and the integrated output disk 34 are united together. Otherwise, the integrated output disk 34 may be formed with an external gear as the high mode first ring gear 91 on its periphery. A carburized hardening treatment is applied such that the toroidal surface of the integrated output disk 34 has a carburized case depth greater than the external gear.

Figure 6:
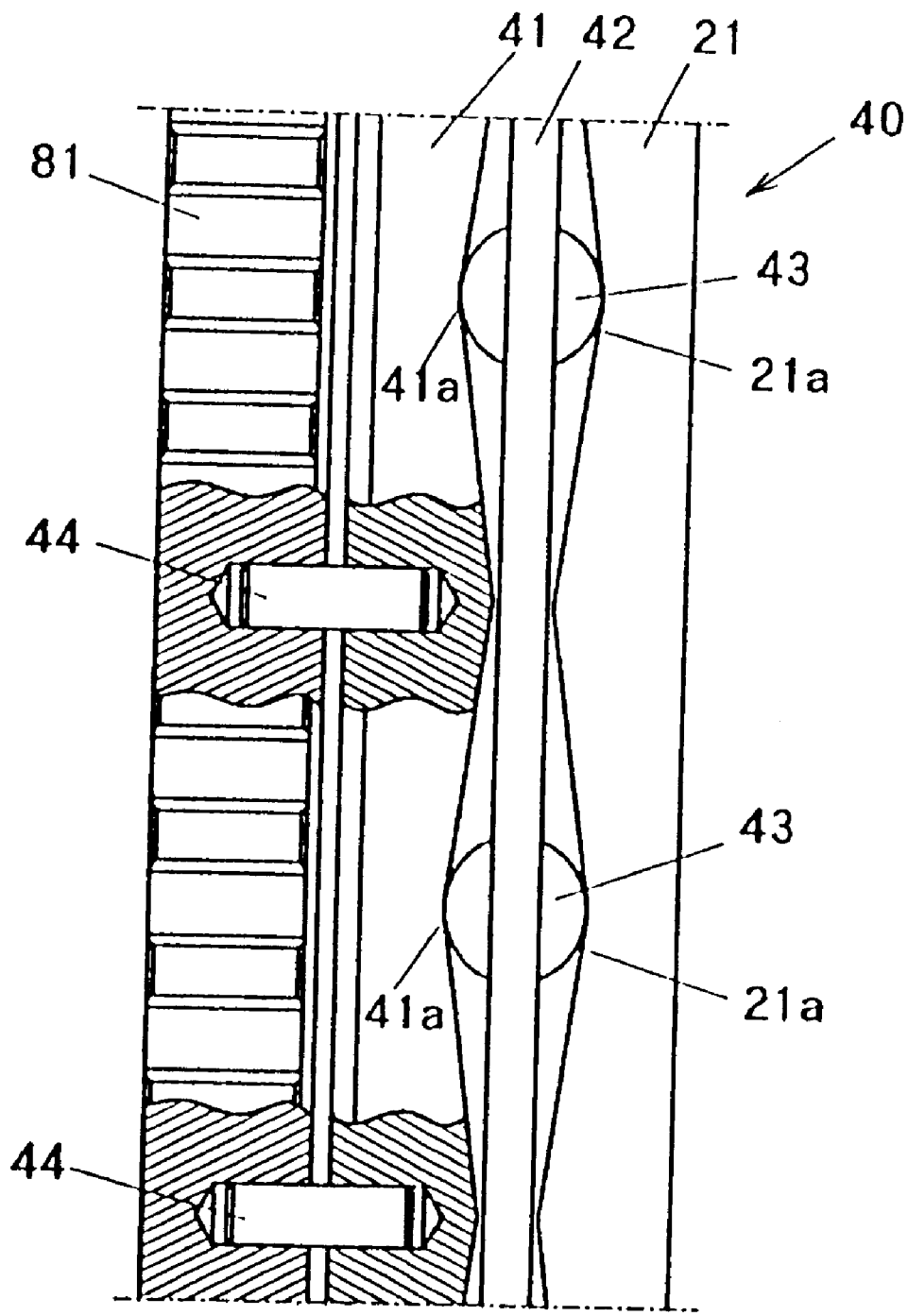
FIG. 6 is an explanatory view showing the correlation between the first gear, a loading cam and an input disk.

FIG. 6 shows the loading cam 40 in detail. The loading cam 40 has a cam disk 41 disposed between the low mode first gear 81 of the low mode gear train 80 and the input disk 21 of the first toroidal continuously variable gear mechanism 20. The cam disk 41 has a surface cam with alternate arrangement of crests and roots 21a formed thereon. The input disk 21 at its back has a surface cam formed thereon correspondingly to the surface cam of the cam disk 41. A plurality of rollers 43 held by a retainer disk 42 are interposed between the surface cams. The cam disk 41 is mechanically coupled to the low mode first gear 81 by means of a plurality of coupling pins 44. As shown in FIG. 6, there are arranged conical disk springs 45, a needle bearing 46 and a bearing race 47 between the cam disk 41 and primary shaft flange 12a. The cam disk 41 is forced against the input disk 21 by the conical disk springs 45. By means of the structure, the rollers 43 are interposed between the roots 21a and 41a of the surface cams to transmit drive torque input to the cam disk 41 through the input shaft 11 via the low mode first gear 81 to the input disk 21 of the first toroidal continuously variable gear mechanism 20 and further to the input disk 31 of the second toroidal continuously variable gear mechanism 30 through the primary shaft 12.

Figure 7:
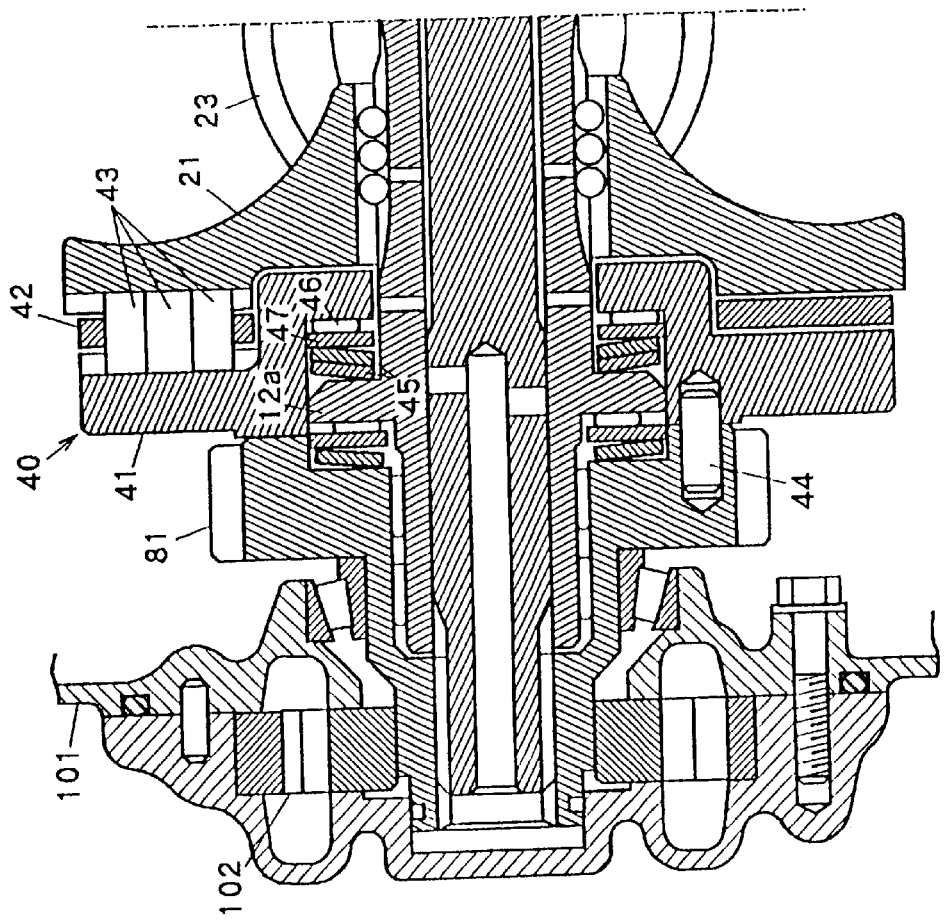
FIG. 7 is an enlarged cross-sectional view of an input shaft and parts mounted on the input shaft.

As shown in FIG. 7, the transmission rear end cover 101 is provided with an oil pump 102 which is driven by means of the low mode first gear 81.

Figure 8:
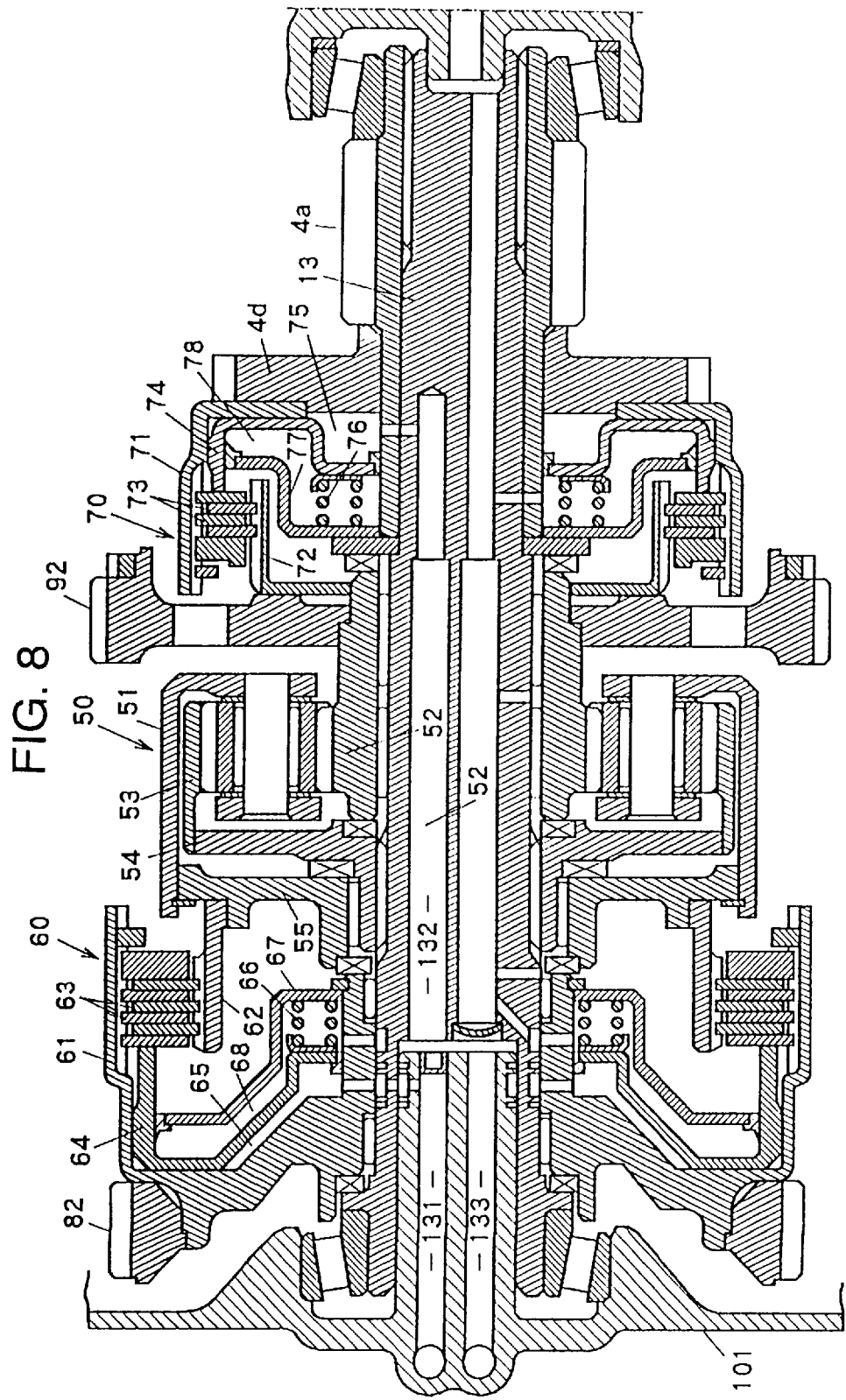
FIG. 8 is an enlarged cross-sectional view of a secondary input shaft and parts mounted on the secondary shaft.

Referring to FIG. 8 showing the planetary gear set 50 and low and high mode clutches 60 and 70, the secondary shaft 13 at its opposite ends is supported for rotation by transmission end covers 101 and 103 through bearings 141 and 142, respectively. The secondary shaft 13 at its middle portion mounts thereon the high mode second gear 92 and the planetary gear set 50 adjacent to the high mode second gear 92 on one side remote from the engine 1. The sun gear 52 of the planetary gear set 50 is meshed with the high mode second gear 92. A splined sleeve flange 54 with an external gear is placed on the splined end of the secondary shaft 13 behind the planetary gear set 50 and is meshed with the internal gear 53 of the planetary gear set 50. Further, the low mode clutch 60 is mounted for rotation on the secondary shaft 13 behind the sleeve flange 54. This low mode clutch 60 comprises an internally splined clutch drum 61 to which the low mode second gear 82 is secured, an externally splined clutch hub 62 disposed radially inside the clutch drum 61 and connected to a flange 55 by means of an externally splined pinion carrier 51, a plurality of splined clutch plates 63 alternately coupled to both clutch drum 61 and clutch hub 62, and a spring loaded piston 64 installed within the clutch drum 61. The clutch drum 61 defines a hydraulic chamber 65 therein behind the piston 64. The piston 64 is forced axially toward the planetary gear set 50 against a spring 66 by coupling hydraulic pressure supplied into the hydraulic pressure chamber 65 by a clutch control unit 120 (see FIG. 3), so as to frictionally couple the clutch plates 63 all together, thereby bringing the low mode second gear 82 and the pinion carrier 51 into engagement with each other. The piston 64 is provided with a balancing piston 67 secured to its front wall to provide a balancing hydraulic chamber 68 therebetween. Lubrication oil in the balancing hydraulic pressure chamber 68 cancels thrust force unevenly acting on the piston 64 by means of centrifugal force acting on the oil in the hydraulic pressure chamber 65 to provide uniform distribution of force acting on the piston 64. Adjacent to the high mode second gear 92 there is a high mode clutch 70. The high mode clutch 70 comprises an internally splined clutch drum 71 which is coupled to a first gear 4a of the output gear train 4 placed on the splined secondary shaft 13 through a parking gear 4d, an externally splined clutch hub 72 disposed radially inside the clutch drum 71 and connected to the high mode second gear 92, a plurality of splined clutch plates 73 alternately coupled to both clutch drum 71 and clutch hub 72, and a spring loaded piston 72 installed within the clutch drum 71. The clutch drum 71 defines a hydraulic pressure chamber 75 therein behind the piston 74. The piston 74 is forced axially toward the planetary gear set 50 against a spring 76 by coupling hydraulic pressure applied into the hydraulic pressure chamber 75 by the clutch control unit 120, so as to frictionally couple the clutch plates 73 all together, thereby bringing the high mode second gear 92 and the first gear 4a of the output gear train 4 placed on the splined secondary shaft 13. The piston 74 is provided with a balancing piston 77 secured to its back wall to provide a balancing hydraulic pressure chamber 78 therebetween. Lubrication oil in the balancing hydraulic pressure chamber 78 cancels thrust force unevenly acting on the piston 74 by means of centrifugal force acting on the oil in the hydraulic pressure chamber 75 to provide uniform distribution of force acting on the piston 74.

The transmission end cover 101 is provided with axial oil paths 131 and 133. Hydraulic oil from the clutch control unit 120 is supplied to the hydraulic pressure chamber 65 of the low mode clutch 60 through the axial oil path 131 and to the hydraulic pressure chamber 75 of the high mode clutch 70 through the axial oil path 133 via an axial oil path 132 formed in the secondary shaft 13.

In the mechanical operation of the continuously variable transmission 10, while the vehicle is stopping, in the low mode control where the low mode clutch 60 is locked and the high mode clutch 70 is released, rotation of the engine 1 is transmitted to the secondary shaft 12 from the input shaft 11 through the low mode gear train 80 comprising the first gear 81, the idle gear 83 and the second gear 82 and simultaneously transmitted to the planetary gear set 50 through the pinion carrier 51 via the low mode clutch 60. The rotation imparted to the input shaft 11 is transmitted to the input disk 21 of the first toroidal continuously variable gear mechanism 20 from the low mode first gear 81 through the loading cam 40 and further transmitted to the integrated output disk 34 through the rollers. 23. Simultaneously, the rotation is imparted to the input disk 31 of the second toroidal continuously variable gear mechanism 30 from the input disk 21 of the first toroidal continuously variable gear mechanism 20 through the primary shaft 12 and further transmitted to the integrated output disk 34 through the rollers 23. At this time, the speed change control unit 110 controls the hydraulic pressure P$_H$ for speed increase or the hydraulic pressure P$_L$ for speed reduction to hold the rollers 23 of the first and second toroidal continuously variable gear mechanisms 20 and 30 at an inclination angle for a specified gear ratio. The rotation imparted to the integrated output disk 34 is further transmitted to the sun gear 52 of the planetary gear set 50 through the high mode gear train 90 comprising the first and second high mode gears 91 and 92. At this time, the speed change control unit 110 controls the hydraulic pressure P$_H$ for speed increase or the hydraulic pressure P$_L$ for speed reduction to hold the rollers 23 of the first and second toroidal continuously variable gear mechanisms 20 and 30 at an inclination angle for a given gear ratio. In this way, the planetary gear set 50 receives the rotation through both pinion carrier 51 and sun gear 52. The carrier 51 and the sun gear 52 rotate at a same speed due to the control of gear ratio of the first and second toroidal continuously variable gear mechanisms 20 and 30, not causing rotation of the internal gear 53 of the planetary gear set 50, i.e. rotation transmitted to the differential 5 from the secondary shaft 12 through the output gear ratio 4, at all. As a result, the continuously variable transmission 10 remains put in a geared neutral state. When varying the gear ratio of the toroidal continuously variable gear mechanism 20 to cause a change in speed ratio between rotation imparted to the pinion carrier 51 and the sun gear 52, respectively, the internal gear 13 rotates in either direction to cause the vehicle to start forward or backward in the low mode control in which the continuously variable transmission 10 is at a high resultant gear ratio.

Figure 9:
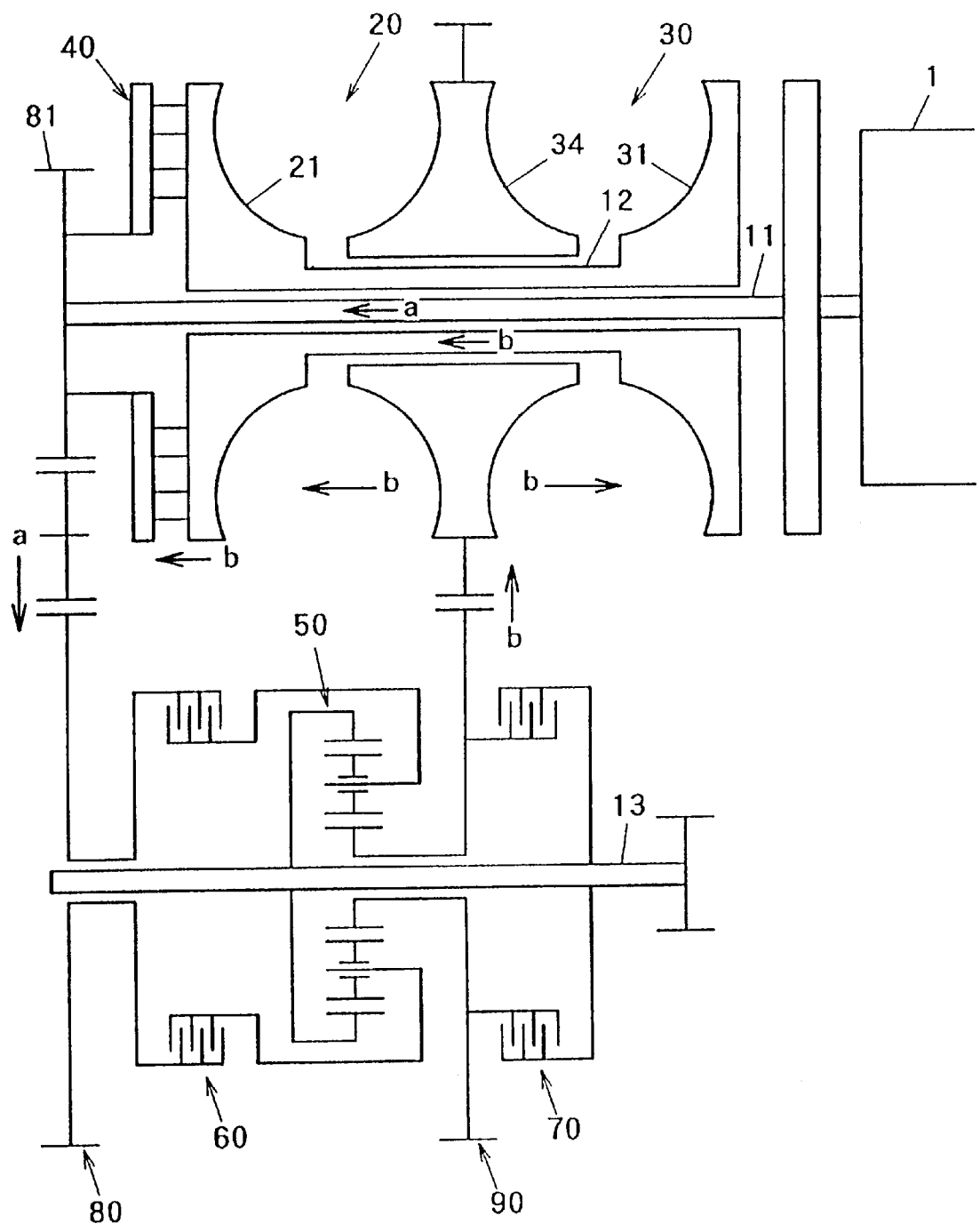
FIG. 9 a schematic skeleton view of a reflux or circulating torque flow in the toroidal type continuously variable transmission in accordance with an embodiment of the invention.

In the low mode gear ratio control, as schematically shown in FIG. 9, while the engine torque is transmitted to the secondary shaft 13 through the low mode gear train 80 via one end of the input shaft 11 remote from the engine 1 as indicated by an arrow a, torque is circulated as reaction force caused in the planetary gear set 50 to the integrated output disk 34 of the first and second toroidal continuously variable gear mechanisms 20 and 30 via the high mode gear train 90 as indicated by an arrow b. Accordingly, in the low mode gear ratio control, torque is transmitted to the input disks 21 and 23 of the first and second toroidal continuously variable gear mechanisms 20 and 30, respectively, from the integrated output disk 34. On the other hand, when releasing the low mode clutch 60 and locking the high mode clutch 70 simultaneously at a specified timing after the vehicle starts to move forward, rotation imparted to the input shaft 11 from the engine 1 is admitted to the input disk 21 of the toroidal continuously variable gear mechanism 20 through the loading cam 40 and further to the integrated output disk 34 through the rollers 23 and 33, and then further imparted to the secondary shaft 13 through the high mode clutch 70 via the high mode gear train 90. At this time, the planetary gear set 50 races, the continuously variable transmission 10 provides a resultant gear ratio depending only upon the gear ratio of the toroidal continuously variable gear mechanism 20. In other words, the continuously variable transmission 10 is controlled to continuously vary its resultant gear ratio in the high mode gear ratio control.

Figure 10:
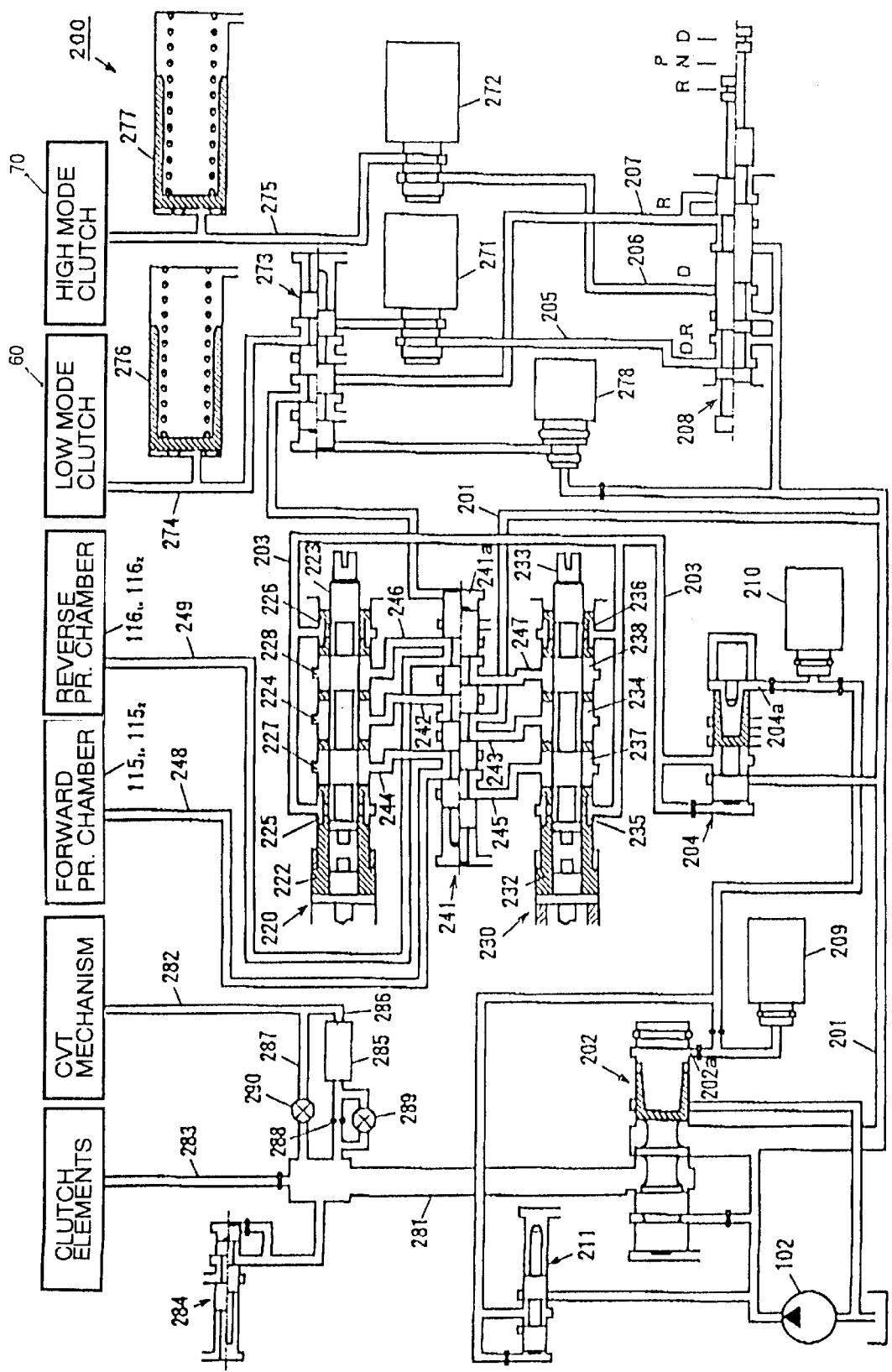
FIG. 10 is a hydraulic circuit diagram of the toroidal type continuously variable transmission.

FIG. 10 shows the hydraulic control circuit 200 comprised of the speed change control unit 110 and the clutch control unit 120 by which the continuously variable transmission 10 is controlled in operation. The hydraulic control circuit 200 includes various spool valves, namely a regulator valve 201 for regulating the pressure of a working oil discharged from the oil pump 102 to a specified level of pressure and delivering it into a main pressure line 201, a relief valve 204 for regulating the primary pressure in the main pressure line 201 to a specified level of relief pressure and delivering it into a relief pressure line 203, and a manual shift valve 208 operated by a manual range shift stick (not shown) to bring the main pressure line 201 into communication with first and second primary pressure lines 205 and 206 in a drive (D) range or with first and third primary pressure line 205 and 207 in a reverse (R) range or to disconnect communication of the main pressure line with all of the first to third primary pressure lines 205–207 in a neutral (N) range or a park (P) range. The regulator valve 202 and the relief valve 204 are accompanied with linear solenoid valves 209 and 210, respectively. Each linear solenoid valve 209, 210 generates a control pressure based on a pressure regulated to a specified level by a reducing valve 211. The regulator valve 202 receives the control pressure at its control pressure port 202a to regulate the specified level of line pressure. Similarly, the relief valve 204 receives the control pressure at its control pressure port 204a to regulate the specified level of relief pressure.

The hydraulic control circuit 200 further includes three spool valves, namely a double-slider forward shift valve (which will be referred to as a forward shift valve for simplicity) 220 for developing a speed increase hydraulic pressure PH according a line pressure and a relief pressure in the drive (D) range, a double-slider reverse shift valve (which will be referred to as a reverse shift valve for simplicity) 230 for developing a speed reduction hydraulic pressure PL in the reverse (R) range, and a shift valve 241 for actuating selectively the shift valves 220 and 230. The shift valve 241 shifts its spool between two positions according to whether a pressure is present at the control pressure port 241a. Specifically, the shift valve 241 shifts the spool to the right end position as seen in FIG. 10 to bring the main pressure line 201 into communication with a line pressure line 242 leading to the forward shift valve 220 when receiving no line pressure at the control pressure port 241a, or to the left end position to bring the main pressure line 201 into communication with a pressure line 243 leading to the reverse shift valve 230 when receiving the line pressure at the control pressure port 241a. The shift valves 220 and 230 are of the same structure. The forward shift valve 220 has an outer sleeve 222 fitted for axial slide movement into an axial bore 221 (see FIG. 11) formed in a valve body 111a of the hydraulic control section 111 of the shift control unit 110 and an inner sleeve 223 fitted for axial slide movement into the outer sleeve 222, and the reverse shift valve 230 has a sleeve 232 fitted for axial slide movement into an axial bore 231 (see FIG. 11) formed in a valve body 111a of the hydraulic control section 111 of the shift control unit 110 and an inner sleeve 233 fitted for axial slide movement into the outer sleeve 232. The forward shift valve 220 has five ports, namely a line port 224 disposed at the middle in an axial direction and connected to the line pressure line 242, first and second relief ports 225 and 226 disposed at opposite ends and connected to the relief pressure line 203, a speed increase pressure port 227 disposed between the line pressure port 224 and the first relief port 225 and a speed reduction pressure port 228 disposed between the line pressure port 224 and the second relief port 226. Similarly, the reverse shift valve 230 has five ports, namely a line pressure port 234 disposed at the middle in an axial direction and connected to the line pressure line 242, first and second relief ports 235 and 236 disposed at opposite ends and connected to the relief pressure line 203, a speed increase pressure port 237 disposed between the line pressure port 234 and the first relief port 235 and a speed reduction pressure port 238 disposed between the line pressure port 234 and the second relief pressure port 236.

When the forward shift valve 220 changes the spool position relative to the valve sleeve 222 toward the right from a neutral position, the valve spool 223 increases an inter-communication opening between the line pressure port 224 and the speed increase pressure port 227, and an inter-communication opening between the second relief port 226 and the speed reduction pressure port 228. Conversely, when the forward shift valve 220 changes the spool position relative to the valve sleeve 222 toward the right from the neutral position, the valve spool 223 increases an inter-communication opening between the line pressure port 224 and the speed reduction pressure port 228, and an inter-communication opening between the first relief port 225 and the speed increase pressure port 227. Similarly, when the reverse shift valve 230 changes the spool position relative to the valve sleeve 232 toward the right from a neutral position, the valve spool 233 increases an inter-communication opening between the line pressure port 234 and the speed increase pressure port 237, and an inter-communication opening between the second relief port 236 and the speed reduction pressure port 238, and, conversely, when the reverse shift valve 230 changes the spool position relative to the valve sleeve 232 toward the right from the neutral position, the valve spool 233 increases an inter-communication opening between the line pressure port 234 and the speed reduction pressure port 238, and an inter-communication opening between the first relief port 235 and the speed increase pressure port 237. The pressure lines 244 and 245 respectively extending from the speed increase pressure ports 227 and 237 of the forward and reverse shift valves 220 and 230 and the pressure lines 246 and 247 respectively extending from the speed reduction pressure ports 228 and 238 of the forward and reverse shift valve 220 and 230 are connected to the shift valve 241.

Shift valve 241 places its valve spool to the right end position to bring the pressure lines 244 and 246 extending from the speed increase and reduction pressure ports 227 and 228 of the forward shift valve 220, respectively, into communication with a pressure line 248 leading to the speed increase pressure chambers 115$_1$ and 115$_2$ of the trunnion driving section 112 and a pressure line 249 leading to the speed reduction pressure chambers 116$_1$ and 116$_2$ of the trunnion driving section 112, respectively. On the other hand, the shift valve 241 places its valve spool to the left end position to bring the pressure lines 245 and 247 extending from the speed increase and reduction pressure ports 237 and 238 of the reverse shift valve 230, respectively, into communication with the pressure lines 248 and 249, respectively.

Figure 11:
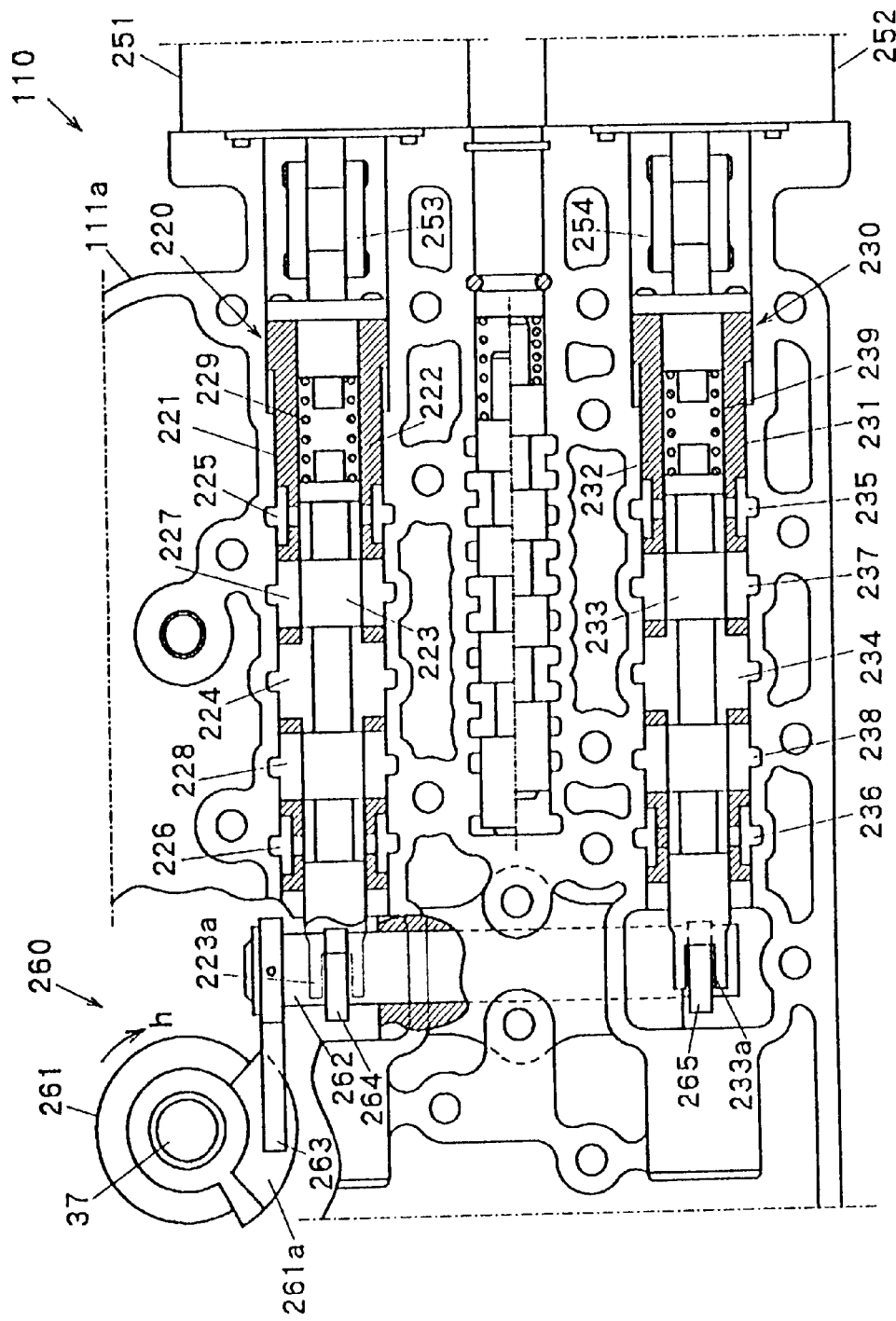
FIG. 11 is a partial cross-sectional view of a three-way valve for generating transmission control hydraulic pressure as viewed in a direction B in FIG. 3.
Figure 12:
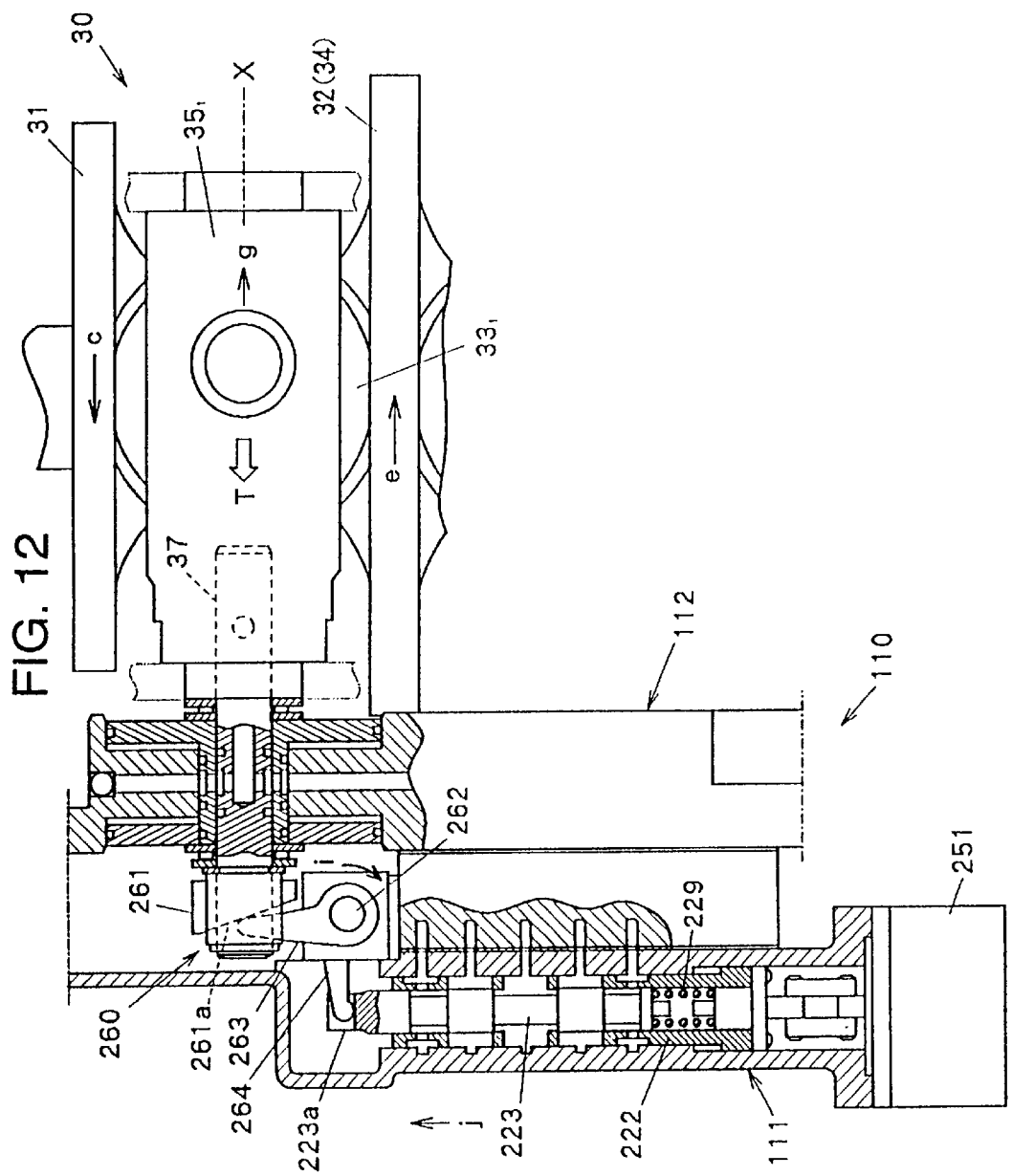
FIG. 12 is a partial cross-sectional view of a cam mechanism as viewed in a direction C in FIG. 3.

FIGS. 11 and 12 show a cam mechanism 260 which moves axially each spool 223, 233 of the forward and reverse shift valves 220 and 230 against a return spring 229, 239 according to axial movement of the valve sleeve 222, 232 caused by a stepping motor 251, 252. The stepping motors 251 and 252 are connected to the valve sleeves 222 and 232 through connecting members 253 and 254, respectively. The cam mechanism 260 includes a cam 261, a shaft 262, a cam follower lever or slider 263 and drive levers 264 and 265. The cam 261 having a cam face 261a is mounted to a trunnion rod 27 of the trunnion 25 of the second toroidal continuously variable gear mechanism 30. The shaft 262 is disposed adjacent and perpendicularly to the valve spools 223 and 233 and supported for rotation by the valve body 111a of the hydraulic control section 111. The cam follower lever 263 is attached at one of its ends to the shaft and is forced at another end to contact with the cam face 261a of the cam 261. The drive lever 264 for forward shift is attached at one of its ends to the shaft 262 and is engaged at another end with an end key slot 223a of the valve spool 223 of the forward shift valve 220. Similarly, the drive lever 265 for reverse shift is attached at one of its ends to the shaft 262 and is engaged at another end with an end key slot 233a of the valve spool 233 of the reverse shift valve 230.

When the first roller 33$_1$ of the second toroidal continuously variable gear mechanism 30 inclines to turn the trunnion 25$_1$ and trunnion rod 27 together about the axis X1, the cam 261 turns to force the cam follower lever 263, as a result of which the drive levers 264 and 265 are turned through a same angle by means of the shaft 262. In this way, the valve spools 223 and 233 of the forward and reverse shift valve 220 and 230 are axially shifted according to the angle of inclination of the roller first roller 33$_1$. Accordingly, the axial spool position depends upon the angle of inclination of the rollers 33 of the second toroidal continuously variable gear mechanism 30, and also of the rollers 23 of the toroidal continuously variable gear mechanism 20, i.e. upon the resultant gear ratio of the continuously variable transmission 10.

Referring back to FIG. 10, the hydraulic pressure control circuit 200 is provided with first and second solenoid valves 271 and 272 for clutch control. The first solenoid valve 271 is communicated with the manual shift valve 208 through the first primary pressure line 205.

Similarly, the second solenoid valve 272 is communicated with the manual shift valve 208 through the second primary pressure line 206. When the first solenoid valve 271 opens, a clutch locking pressure produced by regulating the line pressure from the first primary pressure line 205 is supplied into the hydraulic pressure chamber 65 of the low mode clutch 60 through a clutch pressure line 274 via a fail-safe valve 273 to lock up the low mode clutch 60. Similarly, when the second solenoid valve 272 opens, a clutch locking pressure produced by regulating the line pressure from the second primary pressure line 206 is supplied into the hydraulic pressure chamber 75 of the high mode clutch 70 through a clutch pressure line 275 to lock up the high mode clutch 70. The clutch pressure lines 274 and 275 are accompanied with accumulators 276 and 277, respectively, to provide gradual development of the clutch locking pressure in the hydraulic pressure chambers 65 and 75 so as thereby to prevent an occurrence of shift shocks. The third primary pressure line 207 extending from the manual shift valve 208 is connected to the control port 241a of the shift valve 241 via the fail-safe valve 273. The shift valve 241 receives a line pressure at its control port 241a to place the valve spool to the left end position (reverse position) when the manual shift valve 208 is in the reverse (R) range position. The fail-safe valve 273 is accompanied with a solenoid valve 278. The solenoid valve 278 provides a control pressure to force the valve spool of the fail-safe valve 273 to the right end position so as thereby to bring the first primary pressure line 205 in communication with the low mode clutch pressure line 274. The solenoid valves 271, 272 and 278 are of a three-way type valve which drains a downstream side when both upstream and downstream sides are shut off.

The hydraulic control circuit 200 is further provided with a lubrication oil line 281 which extends from a drain port of the regulator valve 202 and branches off to a lubrication oil line 282 leading to the first and second toroidal continuously variable gear mechanisms 20 and 30 and a lubrication oil line 283 leading to continuously variable transmission parts other than the toroidal continuously variable gear mechanisms 20 and 30. The lubrication oil line 281 is provided with a relief valve 284 to adjust the lubrication oil at a specified level of pressure. An upstream part of the lubrication oil line 282 branches off into an oil line 286 provided with a cooler 285 for cooling the lubrication oil and an oil line 287 bypassing the cooler 285. The oil line 286 upstream from the cooler 285 is provided with an orifice 288 and a first switch valve 289 disposed in parallel. The bypass oil line 287 is provided with a second switch valve 290. Delivery of the lubrication oil to the first and second toroidal continuously variable mechanisms 20 and 30 is controlled by means of the first and second switch valves 289 and 290. According to incoming signals from a control unit 300 (which will be described in detail later with reference to FIG. 13) comprised mainly of a microprocessor, the second switch valve 290 opens to permit the working oil or lubrication oil to flow to the toroidal continuously variable gear mechanisms 20 and 30 bypassing the cooler 285 when the lubrication oil is at a temperature lower than a specified temperature and at a pressure higher than a specified pressure for the purpose of preventing aggravation of flowability of the lubrication oil due to mechanical resistance of the cooler 285 and preventing the cooler 285 from encountering damages and a decrease in durability due to the high pressure lubrication oil. In all other cases, the second switch valve 290 closes to make the lubrication oil pass through the cooler before reaching the toroidal continuously variable gear mechanisms 20 and 30. By this way, oil films on the toroidal surfaces of the input and output disks 21, 22, 31 and 32 are maintained in good conditions, so as to protect contact surfaces of the toroidal disks with the rollers 23 and 33. The first switch valve 289 opens and closes according to incoming signals from the control unit 300. Specifically, the first switch valve 289 closes when, while the second switch valve 290 remains closed, the engine 1 operates at a speed of rotation lower than a specified speed of rotation and the vehicle runs at a velocity lower than a specified velocity. This is because, in the case of lower engine speeds of rotation and/or lower vehicle velocities, while the toroidal continuously variable gear mechanism 20, 30 has a demand for a small amount of lubrication oil, the low and high mode clutches 60 and 70 needs a specified amount of lubrication oil. The lubrication oil supplied to the toroidal continuously variable gear mechanism s 20 and 30 through the lubrication oil line 282 is also supplied to bearings supporting the rollers 23 and 33 through an oil line 282a (see FIG. 3) and sprayed on the toroidal surfaces through a nozzle 282b (see FIG. 3).

Figure 16:
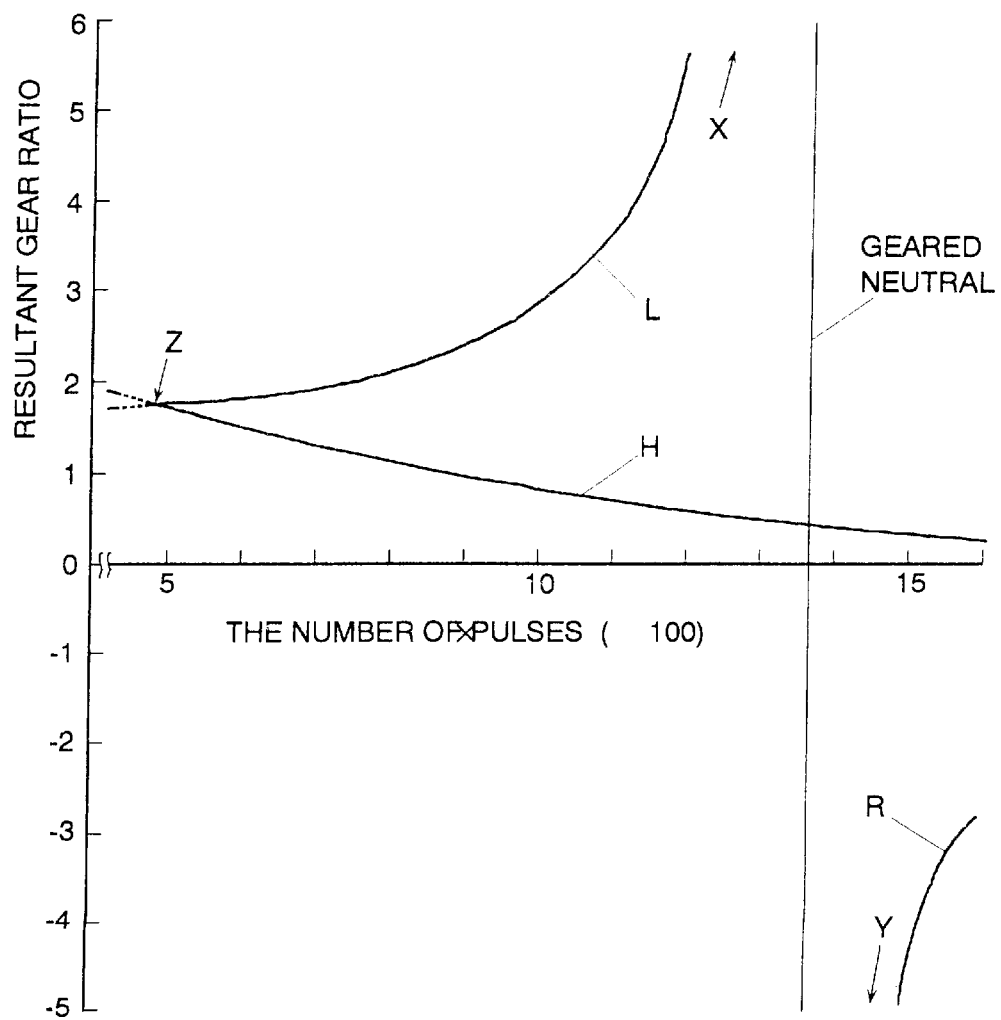
FIG. 16 is a characteristic diagram showing the relationship between the number of pulses applied to a stepping motor and resultant gear ratio of the toroidal type continuously variable transmission.

Gear ratio control of the continuously variable transmission 10 depicted in FIG. 1 is executed through the control unit 300 shown in block diagram in FIG. 16.

Figure 13:
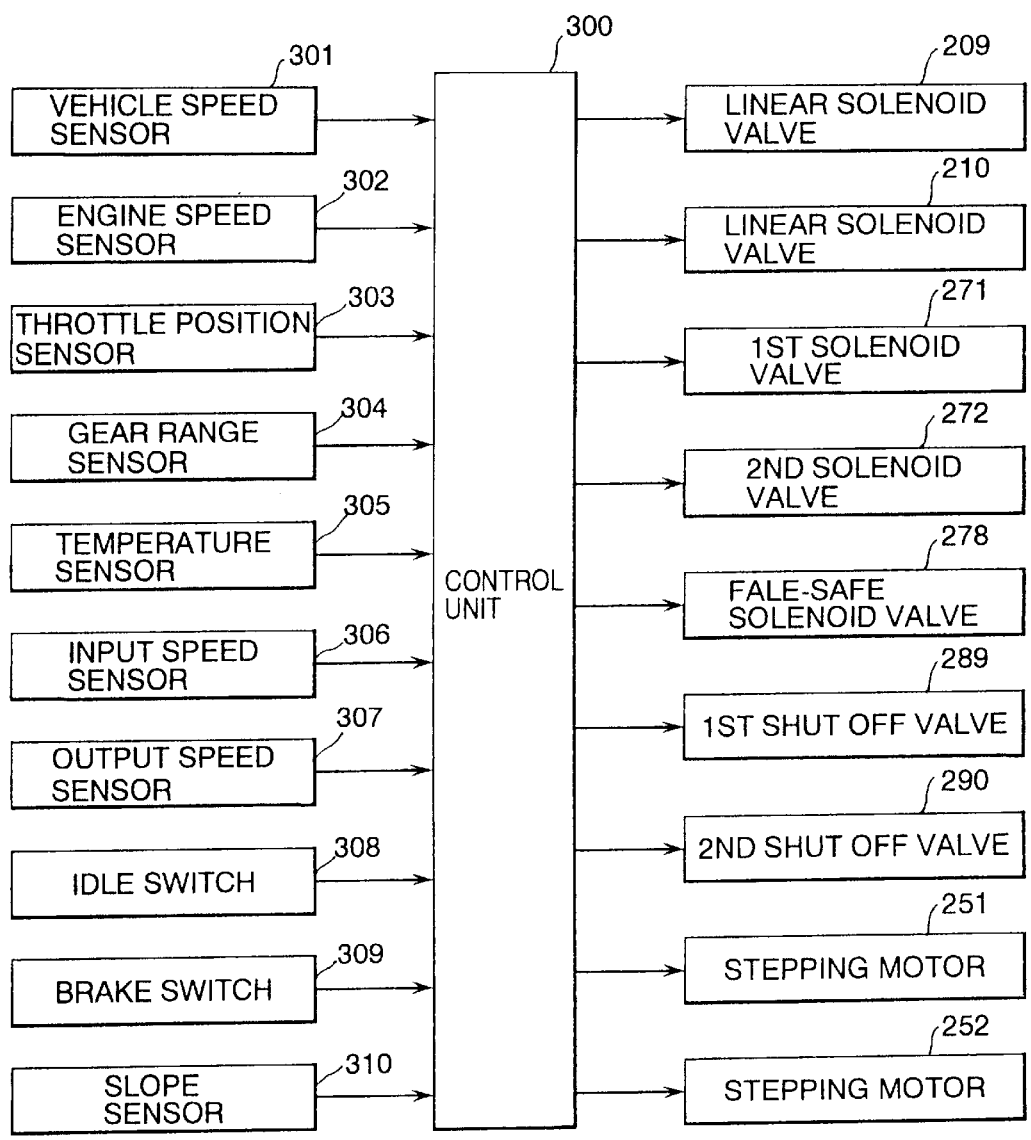
FIG. 13 is a block diagram showing a control system of the toroidal type continuously variable transmission of the invention.

Referring to FIG. 13, the control unit 300 receives various signals from sensors and switches including at least an engine speed sensor 302, a throttle position or opening sensor 303, a transmission position sensor 304, an oil temperature sensor 305, speed sensors 306 and 307, an idle switch 308, a brake switch 309 and a slope sensor 310. The speed sensor 306 attached to the low mode clutch drum 61 detects a speed of input disk 21 of the first toroidal continuously variable gear mechanism 20, and the speed sensor 307 attached to the second gear 92 of the high mode gear train 90 detects a speed of input disk 31 of the first toroidal continuously variable gear mechanism 30. The idle switch 308 detects release of the accelerator pedal. The brake switch 309 detects stepping on of the brake pedal. The slope sensor 310 detects a slope of a road on which the vehicle is traveling. These sensors and switches are well known in various types in the art and may take any known type. The control unit 300 provides control signals for various solenoid valves 209, 210, 271, 272, 278, 289 and 290, stepping motors 251 and 252, and other electrically controlled elements in the hydraulic control circuit 200 according to driving conditions represented by signals from the switches and sensors 301–310.

The following description will be directed to basic speed change operation of the continuously variable transmission 10. As was previously described above, the hydraulic control circuit 200 shown in FIG. 10 is in the drive (D) range in which the manual shift valve 208 takes the drive (D) position to force the shift valve 241 to maintain the valve spool in the right end position (the forward position). Because the toroidal continuously variable gear mechanisms 20 and 30 shown in FIG. 3 operate in the same way, the explanation will be given relating to the roller 23₁ and trunnion 25₁ of the first toroidal continuously variable gear mechanism 20 by way of example, and the same is true for other rollers and trunnions.

When the hydraulic control circuit 200 is actuated in response to a signal from the control unit 300, the solenoid valves 209 and 210 are actuated to generate a specified level of pressure as a line pressure at the control port 202a of the regulator valve 202 and a specified level of pressure as a relief pressure at the control port 204a of the relief valve 204.

Figure 14:
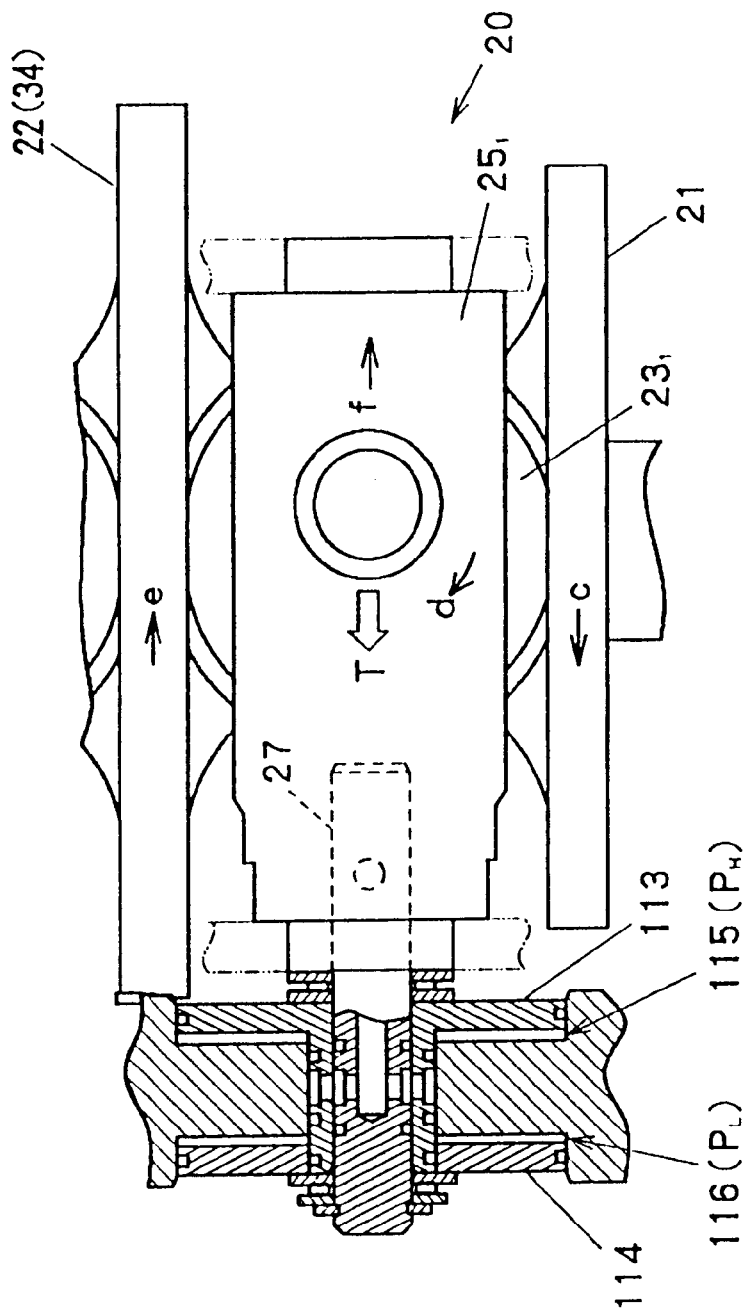
FIG. 14 is an explanatory diagram of traction force.

The line pressure is supplied to the inlet pressure port 224 of the forward shift valve 220 through the main pressure line 201 and pressure line 242 via the shift valve 241, and the relief pressure is supplied to the first and second relief ports 225 and 226 of the forward shift valve 220 through the pressure line 203. Based on these line pressure and relief pressure, the forward shift valve 220 controls the hydraulic pressure difference ($\Delta P = P_H - P_L$) between a hydraulic pressure $P_H$ for speed increase and a hydraulic pressure $P_L$ for speed reduction. This hydraulic pressure difference control is performed to hold the trunnion 25 and roller 23 in the neutral positions against tractive force (T) exerted on the trunnion 25 or to force them in the axial direction X from the neutral position so as to vary the inclination of the roller for varying the gear ratio of the toroidal continuously variable gear mechanism 20. As shown in FIG. 14, when the roller 23 is driven by the input disk 21 rotating in a direction indicated by an arrow c, these trunnion 25 and roller 23 are applied with force by which they are drawn in the same direction c. On the other hand, when the output disk 22 is rotated in a direction indicated by an arrow e (which is the direction x shown in FIG. 3) by the roller 23 rotating in a direction indicated by an arrow d, reaction force is exerted tractive force T in a direction opposite to the rotational direction e of the output disk 22 on the roller 23 and trunnion 25. In order to hold the roller 23 in the neutral position against the tractive force T, the speed increase and reduction pressure chambers 115 and 116 are supplied with speed increase and speed decrease hydraulic pressures $P_H$ and $P_L$, respectively which are controlled to provide a hydraulic pressure difference ($\Delta P = P_H - P_L$) balanced with the tractive force T. When increasing the gear ratio of the toroidal continuously variable gear mechanism 20 for forward drive of the vehicle, the forward shift valve 220 forces the valve sleeve 222 to shift toward the left as viewed in FIG. 11 or to the right as viewed in FIG. 10 to decrease the inter communication openings between the inlet port 224 and the speed increase pressure port 227 and between the second relief port 226 and the speed reduction pressure port 228. As a result, the hydraulic pressure $P_H$ introduced into the speed increase pressure chamber 115 rises due to the relief pressure which is relatively high, and the hydraulic pressure $P_L$ introduced into the speed reduction pressure chamber 116 drops due to the line pressure which is relatively low, as a result of which the tractive force T becomes higher than the hydraulic pressure difference ($\Delta P = P_H - P_L$) to force the trunnion 25 and roller 23 in a direction indicated by an arrow f as shown in FIG. 14. Following the movement, the roller 23 inclines in a direction in which it shifts its contact point with the input disk 21 radially outward and its contact point with the output disk 22 radially inward to reduce the gear ratio. The same inclination of the roller 23 is caused in the second toroidal continuously variable gear mechanism 30. Due to the tractive force exceeding the hydraulic pressure difference ($\Delta P = P_H - P_L$), the roller 33 inclines in a direction in which it shifts its contact point with the input disk 31 radially outward and its contact point with the output disk 32 radially inward following movement of the trunnion 35 in a direction indicated by an arrow g. At this time, however, the cam 261 of the cam mechanism 260 turns through the same angle as the roller 33 in the same direction as indicated by an arrow h in FIG. 11, as a result of which the cam follower lever 263, and hence the shaft 262 and the drive lever 264, turns in a direction indicated by an arrow i shown in FIG. 12. Consequently, the forward shift valve 220 shifts the valve spool 223 in a direction indicated by an arrow j in FIG. 12, or to the left as viewed in FIG. 11, under influence of the return spring 229. Because this direction j is coincident with the direction in which the valve sleeve 222 is shifted by the stepping motor 251, the inter-communication openings between the inlet port 224 and the speed increase pressure port 227 and between the second relief port 226 and the speed reduction pressure port 228 regain their initial neutral positions, so as to balance the hydraulic pressure difference ($\Delta P = P_H - P_L$) with the tractive force T, thereby achieving the gear ratio change of the toroidal continuously variable gear mechanism 20. The gear ratio change of the toroidal continuously variable gear mechanism 30 is fixed at the gear ratio. In this instance, the speed change is completed at a point of time that the valve spool 223 reaches the neutral position relative to the valve sleeve 222. Since the neutral position is the position to which the valve sleeve 222 has been shifted by the stepping motor 251 and corresponds to the inclined angle of the roller 23 caused by the cam mechanism 260, the position of the valve sleeve 222 corresponds to the inclined angle of the roller 23, and hence the trunnion 25. This means that the controlled variable of the stepping motor 251 determines the gear ratio of the toroidal continuously variable gear mechanism 20. Accordingly, the gear ratio of the toroidal continuously variable gear mechanism 20 is varied according to the number of pulses applied to the stepping motor 251. The gear ratio control of the toroidal continuously variable gear mechanism 30 is achieved in the same way when the valve sleeve 222 of the forward shift valve 220 has been shifted in the opposite direction. In this instance, the toroidal continuously variable gear mechanism 20 increases its gear ratio.

Figure 15:
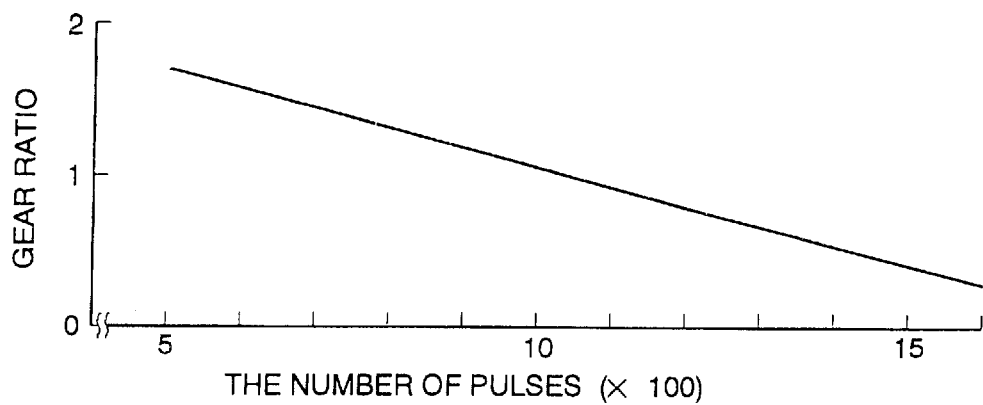
FIG. 15 is a characteristic diagram showing the relationship between the number of pulses applied to a stepping motor and gear ratio of the toroidal mechanism.

FIG. 15 shows the relationship between the number of pulses for the stepping motor 251, 252 and gear ratio of the toroidal continuously variable gear mechanism 20, 30. As apparent, the gear ratio of the toroidal continuously variable gear mechanism 20, 30 decreases with an increase in the number of pulses.

FIG. 16 shows the relationship between the number of pulses for the stepping motor 251, 252 and resultant gear ratio N of the continuously variable transmission 10 by the control of gear ratio of the toroidal continuously variable gear mechanism 20. As was previously described, while the toroidal continuously variable gear mechanism 20 changes its gear ratios according to the numbers of pulses applied to the stepping motors 251 and 252, the continuously variable transmission 10 provides a resultant gear ratio N which differs according to modes of gear ratio control, i.e. according to which mode clutch 60 or 70 has been locked. When the continuously variable transmission 10 is put in the high mode gear ratio control, rotation of the integrated output disk 34 is imparted directly to the secondary shaft 13 through the high mode gear train 90 and the high mode clutch 70 locked up. As shown in FIG. 16, the characteristic curve of resultant gear ratio N H of the continuously variable transmission 10 relative to the number of pulses agrees with the characteristic curve of gear ratio of the toroidal continuously variable gear mechanism 20, 30 shown in FIG. 15. It is of course that the gear ratios of the toroidal continuously variable gear mechanisms 20 and are different from each other according to the difference in diameter of the first and second gears 91 and 92 of the high mode gear train 90 or the number of teeth between the first and second gears 91 and 92 of the high mode gear train 90. On the other hand, when the continuously variable transmission 10 is put in the low mode gear ratio control, while rotation of the engine 1 is imparted to the pinion carrier 51 of the planetary gear set 50 from the input shaft 11 through the low mode gear train 80 and the low mode clutch 60 locked up, rotation of the integrated output disk 34 is imparted to the sun gear 52 of the planetary gear set 50 through the high mode gear train 90. In this case, when the planetary gear set 50 holds the internal gear 53, which is a transmission output gear, at a rotational speed of 0 (zero) by controlling the toroidal continuously variable gear mechanisms 20 and 30 to provide a specified ratio of input rotational speeds between the pinion carrier 51 and sun gear 52, the continuously variable transmission 10 is put in the geared neutral state in which the internal gear 53 stands still. At this time, while the resultant gear ratio N increases infinitely as indicated by arrows P and Q in FIG. 16, when the numbers of pulses admitted to the stepping motors 251 and 252 are subsequently decreased so that the toroidal continuously variable gear mechanisms 20 and 30 are forced to increase their gear ratios and the speed of rotation imparted to the sun gear 52 of the planetary gear set 50 drops consequently, the planetary gear set 50 causes the internal gear 53 to start rotation in the forward direction. In this way, the continuously variable transmission 10 reduces its resultant gear ratio N following reduction in the number of pulses admitted to the stepping motor 251, 252, establishing the low mode gear ratio control in the drive (D) range where the resultant gear ratio N varies along the characteristic curve L. These high and low gear ratio control characteristic curves H and L in the drive (D) range intersect at a toroidal gear ratio of, for example, approximately 1.8 indicated by an arrow R which is provided correspondingly to 500 pulses. Accordingly, the gear ratio control is changed over during varying continuously the resultant gear ratio N of the continuously variable transmission 10 by switching lock-up from one to another between the low and high mode clutches 60 and 70 at the toroidal gear ratio. On the other hand, when the number of pulses to the stepping motor 251, 252 is increased subsequently to achievement of the geared neutral state so that the toroidal continuously variable gear mechanisms 20 and 30 are forced to reduces their gear ratios and the speed of rotation imparted to the sun gear 52 of the planetary gear set 50 rises consequently, the planetary gear set 50 causes the internal gear 53 to start to rotate in the reverse direction. In this way, the continuously variable transmission 10 provides the reverse mode of gear ratio control in the reverse (R) range where the resultant gear ratio N increases along the characteristic curve R as the number of pulses increases.

The control unit 300 controls the resultant gear ratio N of the continuously variable transmission 10 based on the characteristic curves according to driving conditions. Specifically, the control unit 300 detects current vehicle speed V and throttle opening $\theta$ based on incoming signals from the speed sensor 301 and throttle position sensor 303 to determine a target engine speed of rotation Neo with reference to a gear ratio control map shown in FIG. 17. Pulsing control of the first and second stepping motor 251 and 252 and locking and unlocking control of the mode clutches 60 and 70 are performed so that the continuously variable transmission 10 provides a resultant gear ratio N (which is represented by an angle a in FIG. 17) corresponding to the target engine speed of rotation Neo on the basis of the resultant gear ratio control curve L, H or R.

As described above, the continuously variable transmission 10 has two power transmission paths for transmitting engine output power to the drive wheels in the low mode gear ratio control in which the low mode clutch 60 is locked and the high mode clutch 70 is unlocked, i.e. the power transmission path between the input shaft 11 and the secondary shaft 13 which includes the loading cam 40, the toroidal continuously variable gear mechanisms 20 and 30, the high mode gear train 90 and the planetary gear set 50 and the power transmission path between the input shaft 11 and the secondary shaft 13 which includes the low mode gear train 80 and the planetary gear set 50 only, and single power transmission path in the high mode gear ratio control in which the low mode clutch 60 is unlocked and the high mode clutch 70 is locked, i e. the power transmission path between the input shaft 11 and the secondary shaft 13 which includes the loading cam 40, the toroidal continuously variable gear mechanisms 20 and 30 and the high mode gear train 90. Accordingly, if the engine 1 causes fluctuations of its rotational speed due to changes in compression pressure during one combustion cycle, the fluctuation of rotational speed are transmitted to the secondary shaft 13 through the power transmission path, and then to the drive wheels through the drive axles 6a and 6b, so that the vehicle body generates vibrations. Because, even in any mode of gear ratio control in the drive (D) range, the continuously variable transmission 10 transmits engine output power to the drive wheels with a continuously varying gear ratio through the toroidal continuously variable gear mechanisms 20 and 30, the control unit 300 is designed and adapted to perform gear ratio change control of the toroidal continuously variable gear mechanisms 20 and 30 such that the continuously variable transmission 10 transmits engine output power to the drive wheels with an effect of preventing or significantly reducing influence of fluctuations of rotational speed of the engine 1 on the drive wheels.

The following description is directed to the principle upon which the gear ratio control for preventing or reducing engine speed fluctuations (which is hereafter referred to as fluctuation reducing gear ratio control) is performed.

The angular velocity of rotation $\Omega e$ of the engine 1 (which periodically changes or oscillates in a sinusoidal manner) is given by the following expression (I)

$$\Omega e = \Omega 0 + \Omega t \cdot \sin \omega t \qquad (I)$$

where $\Omega 0$ is the basic angular velocity of rotation or the central value of oscillating angular velocity of rotation, t is the time, and $\Omega t \cdot \sin \omega t$ is the component of fluctuation in the event the amplitude of an oscillation of angular velocity is $\Omega t$.

Letting Ng be the gear ratio of the toroidal continuously variable gear mechanism 20, 30, the speed of rotation of the integrated output disk 34 connected to the secondary shaft 13, and hence the first gear 91, is given by the following expression (II)

$$Ng \cdot \Omega e = Ng(\Omega 0 + \Omega t \cdot \sin \omega t) \qquad (II)$$

It is apparent from the above expression that the rotational speed of the integrated output disk 34 periodically fluctuates due to a component of $Ng \cdot \Omega t \cdot \sin \omega t$.

In a vibration system having a phase opposite to the above vibration system of rotational speed, the gear ratio Ng of the toroidal continuously variable gear mechanism 20, 30 is given by the following expression $$Ng = Ng0 - Ngt \cdot \sin \omega t \qquad (III)$$

where Ng0 is the basic gear ratio or the central value of oscillating gear ratio and $Ngt \cdot \sin \omega t$ is the fluctuation component in the event the amplitude of an oscillation of gear ratio is Ngt.

The speed of rotation of the integrated output disk 34, and hence the first gear 91, is given by the following expression (IV) when the expression (III) is substituted in the expression (II)

$$Ng \cdot \Omega e = (Ng0 - Ngt \cdot \sin \omega)\cdot(\Omega 0 + t \cdot \sin \omega) = Ng0 \cdot \Omega 0 + (Ng0 \cdot \Omega t \cdot \sin \omega t - Ngt \cdot \Omega 0 \cdot \sin \omega t - Ngt \cdot \Omega t \cdot \sin^2 \omega t) \qquad (IV)$$

When expressing the second member of the expression (IV) and the amplitude Ngt of the oscillation of gear ratio Ng of the toroidal continuously variable gear mechanism 20, 30 as follows $$D = Ng0 \cdot \Omega t \cdot \sin \omega t - Ngt \cdot \Omega 0 \cdot \sin \omega t - Ngt \cdot \Omega t \cdot \sin^2 \omega t \qquad (V)$$

$$Ngt = Ng0 \cdot \Omega t / \Omega 0 \qquad (VI)$$

The expression (VI) is given by solving the expression (V), taking the second order component given by the third member is 0 (zero).

The second member D of the expression (IV) is rewritten as follows $$D = (Ng0 \cdot \Omega t^2 / \Omega 0) \cdot \sin^2 \omega t \qquad (VII)$$

Since the amplitude of oscillation of angular velocity of rotation $\Omega t$ is generally considerably small relatively to the basic angular velocity of rotation $\Omega 0$, the value of second member D approximates 0 (zero).

That is, even in the event the angular velocity of rotation $\Omega e$ oscillates as given by the expression (I), by changing the gear ratios Ng of the toroidal continuously variable gear mechanism 20, 30 reversely in phase after determining the amplitude of oscillation of gear ratio Ngt by the use of expression (VI) for example, the speed of rotation of the integrated output disk 34, and hence the first gear 91, given by the expression (IV) is approximated by its first member $Ng0 \cdot \Omega 0$ which is a fixed component.

Figure 18:
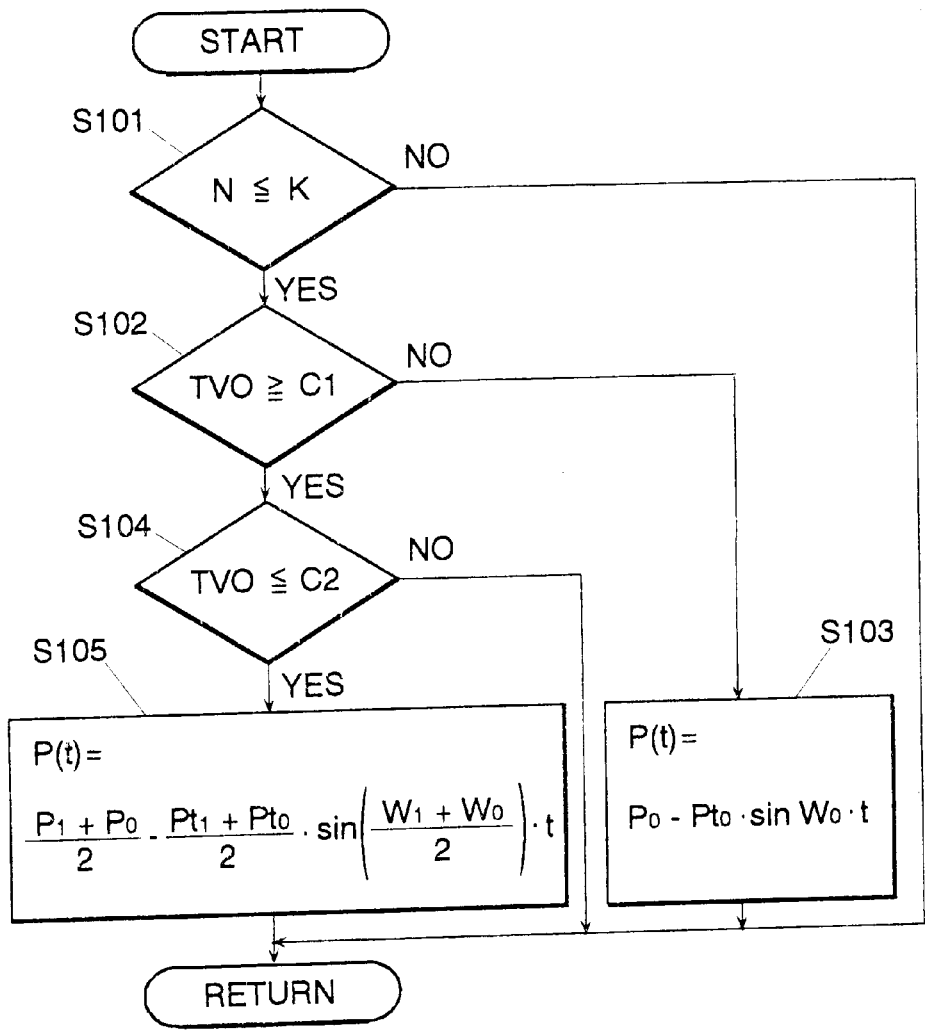
FIG. 18 is a flow chart illustrating a sequence routine of output speed fluctuation control for a microprocessor of the control unit.

FIG. 18 is a flow chart illustrating a sequence routine of the fluctuation reducing gear ratio control for a microprocessor of the control units 300.

When the flow chart logic commences and control proceeds directly to a function block at step S101 where a judgement is made as to whether a current engine speed N is equal to or lower than a predetermined threshold value K. When the engine speed N is higher than the threshold value K, the flowchart logic orders return to perform another routine. This means that, since fluctuations appearing in the angular velocity of input rotation or the output rotational speed of the engine is not so large when the speed of input rotation N from the engine 1 is relatively high, the gear ratio of the toroidal continuously variable gear mechanism 20, 30 is prevented from being over controlled. On the other hand, when the engine speed N is equal to or lower than the threshold value K, this indicates that there are large fluctuations possibly appearing in the angular velocity of input rotation of the transmission or the output rotational speed of the engine 1, then judgements are made at steps S102 and S104 as to whether a current throttle opening TVO is between predetermined under and upper threshold values C1 and C2, respectively. When the throttle opening TVO is equal to or smaller than the under threshold value Cl, this indicates that the vehicle is ordinarily running with the throttle valve remaining open small, then a calculation of the number of gear ratio control pulses P(t) given by the following expression in conformity to the expression (III) is made at step S103.

$$P(t) = Po - Pto \cdot \sin Wo \cdot t$$

where Po is the current central value of the oscillation of gear ratio control pulses, Pto is the current amplitude of the oscillation of gear ratio control pulses given by the expression (VI), and Wo is the current angular velocity of rotation of the engine.

The number of gear ratio control pulses P(t) is controlled in phase reversely to the oscillation or fluctuation of input rotation from the engine. By driving the stepping motor with the gear ratio control pulses, fluctuations of output rotation from the continuously variable transmission 10 is reduced during ordinarily running.

When the throttle opening TVO is larger than the predetermined under threshold value C1 but equal to or smaller than the predetermined upper threshold value C2, this indicates that the vehicle is slowly accelerating, then a calculation of the number of gear ratio control pulses P(t) given by the following expression in conformity to the expression (III) is made at step S103.

$$P(t) = (P_1 + Po)/2 - \{(Pt_1 + Pto)/2\} \cdot \sin\{(W_1 + Wo)/2\} \cdot t$$

where P1 is the central value of the oscillation of target gear ratio control pulses, Pt1 is the amplitude of the oscillation of target gear ratio control pulse given by the expression (VI), and W1 is the angular velocity of output rotation of the engine while the target gear ratio control pulses are admitted to the stepping motor.

The number of gear ratio control pulses P(t) is controlled in phase reversely to fluctuations of output rotation of the engine. By driving the stepping motor with the gear ratio control pulses, fluctuations of output rotation from the continuously variable transmission 10 is reduced during slow acceleration.

On the other hand, when the throttle opening TVO is larger than the upper threshold value C2, this indicates that the vehicle is rapidly accelerating, then the flowchart logic orders return to perform another routine. That is, because there is a prior demand for responsiveness to rapid acceleration, the fluctuation reducing gear ratio control is interrupted so as to conduct the ordinary gear ratio control quickly.

While the vehicle is ordinarily running, the fluctuation reducing gear ratio control may be interrupted to prevent the gear ratio of the toroidal continuously variable gear mechanism 20, 30 from being over controlled. This is because fluctuations appearing in the angular velocity of input rotation or the output rotational speed of the engine is not so large during ordinarily running, i.e. while the speed of input rotation N is lower than the threshold value K, as compared with those during acceleration.

As described above, while the toroidal continuously variable gear mechanisms 20 and 30 are controlled so that the continuously variable transmission 10 removes repercussions of the fluctuations of rotational speed of the engine 1 on the drive wheels so as thereby to prevent the vehicle body from causing vibrations during ordinarily running in the drive (D) range, nevertheless, the problem of vibrations of the vehicle body possibly occurs while the continuously variable transmission 10 is put in non-drive range such as the neutral (N) range and the park (P) range where both low and high mode clutches 60 and 70 are unlocked. Specifically, since both power transmission paths are shut off in the non-drive range such as the neutral (N) range and the park (P) range, all of the integrated output disk 34 of the toroidal continuously variable gear mechanisms 20 and 30, the first and second gears 81 and 82 of the low mode gear train 80 and the first and second gears 91 and 92 of the high mode gear train 90 race while the engine 1 operates. Even while the power transmission path is shut off between the engine and the drive wheels, the rotating elements, such as the second gears 82 and 92 of the low and high mode gear trains 80 and 90, mounted on the secondary shaft 13 remain rotated by the engine 1 during idling, so that the rotating element of the planetary gear set 50 mounted on the secondary shaft 13 resonates, which causes the vehicle body to generate vibrations.

In view of the above, the control unit 300 is designed and adapted to perform extra gear ratio change control of the toroidal continuously variable gear mechanisms 20 and 30 such that the vehicle body is prevented from generating vibrations due to idling of the engine 1 in the non-drive range (which is hereafter referred to as non-drive range gear ratio control).

Figure 19:
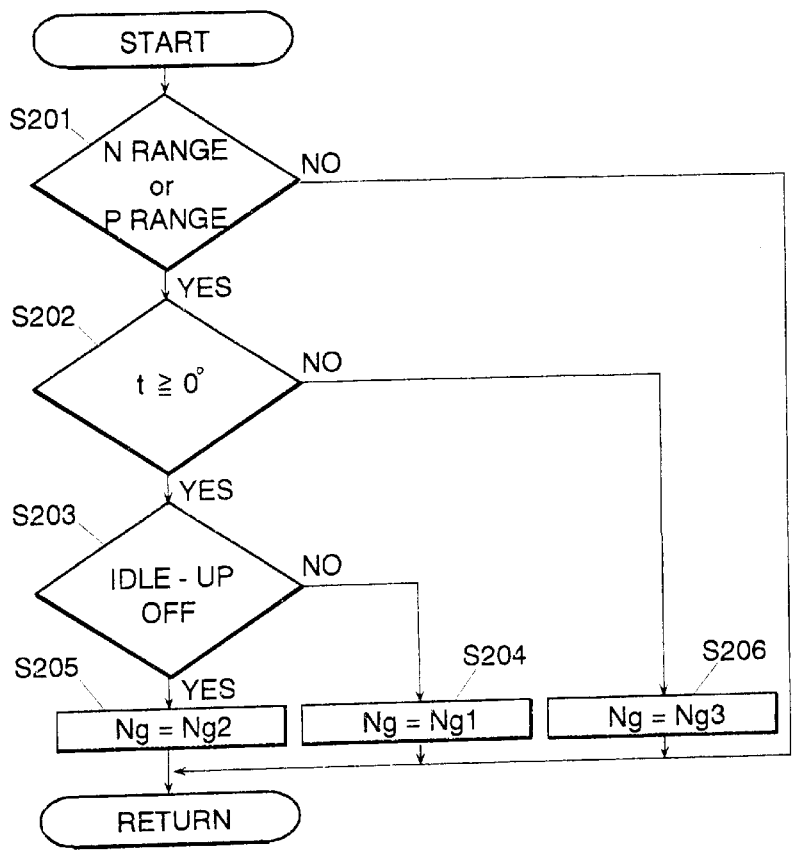
FIG. 19 is a flow chart illustrating a sequence routine of off-drive range gear ratio control for the microprocessor of the control unit.

FIG. 19 is a flow chart illustrating a sequence routine of the non-drive range gear ratio control for a microprocessor of the control units 300.

When the flow chart logic commences and control proceeds directly to a function block at step S201 where a judgement is made as to whether the continuously variable transmission 10 is put in the non-drive range, i.e. the neutral (N) range or the park (P) range. When the continuously variable transmission 10 is put out of the non-drive range, the flowchart logic orders return to perform another routine. When the continuously variable transmission 10 is put in the non-drive range, a judgement is further made at step S202 as to whether the temperature of working oil in the continuously variable transmission 10 is equal to or higher than 0° C. which is a lower limit on a permissible viscosity of the working oil. When the temperature of working oil in the continuously variable transmission 10 is equal to or higher than 0° C., another judgement is made at step S203 as to whether the engine 1 is put in an idle-up state. The term "idle-up state" as used herein shall means and refer to the state in which the engine 1 operates at a speed of rotation higher than an ordinary idle speed of rotation due to engine loading increased by actuation of an engine driven supplementary equipment such as an air-conditioning system while the idle switch 308 is turned on during idling. When the engine 1 is in the idle-up state while the continuously variable transmission 10 is in the non-drive range and the temperature of working oil is higher than 0° C., the toroidal continuously variable gear mechanisms 20 and 30 are controlled to provide a first gear ratio Ng1 at step S204. On the other hand, when the engine 1 is out of the idle-up state while the continuously variable transmission 10 is in the non-drive range and the temperature of working oil is higher than 0° C., the toroidal continuously variable gear mechanisms 20 and 30 are controlled to provide a second gear ratio Ng2 at step S205. Further, when the temperature of working oil is lower than 0° C. while the continuously variable transmission 10 is in the non-drive range, the toroidal continuously variable gear mechanisms 20 and 30 are controlled to provide a third gear ratio Ng3 at step S206.

Figure 20:
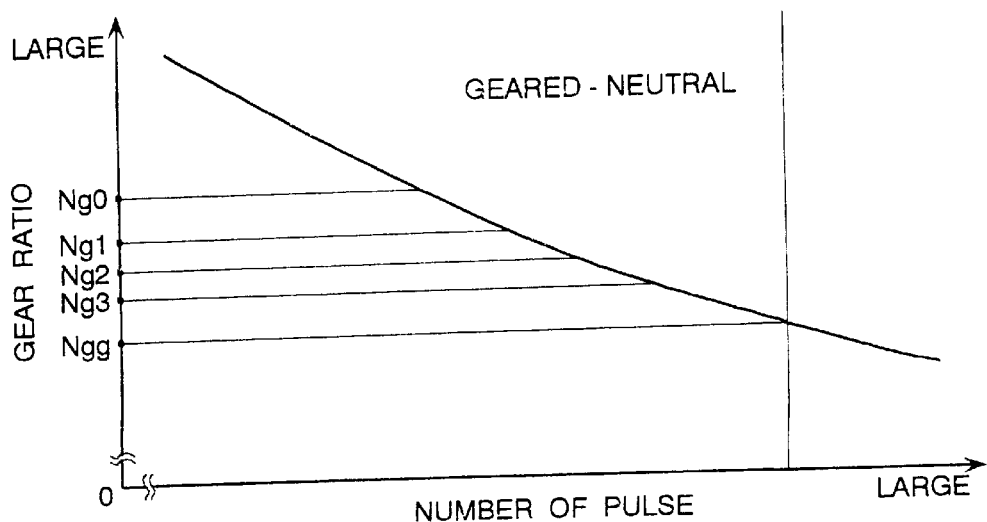
FIG. 20 is a characteristic diagram of resultant gear ratio in the off-drive range gear ratio control.

When starting in the drive (D) range, the continuously variable transmission 10 is controlled such that the toroidal continuously variable gear mechanisms 20 and 30 provides a gear ratio Ngo risen from the neutral gear ratio Ngg at which the geared neutral state is achieved, as shown in FIG. 20. In this manner, the continuously variable transmission 10 yields creep force likely an automatic transmission equipped with a torque converter as well as avoiding difficulty in precisely controlling such that the toroidal continuously variable gear mechanisms 20 and 30 provide the specific gear ratio Ngg which is the only gear ratio for achievement of the geared neutral state. These first to third gear ratios Nr1, Ng2 and Ng3 become lower in steps from the neutral gear ratio Ngo in this order. That is, in any case, since any gear ratio of the toroidal continuously variable gear mechanisms 20 and 30, i.e. Ng1, Ng2 or Ng3, is lower than the gear ratio Ngo at starting in the drive (D) range, or on the higher speed side from the gear ratio Ngo at starting in the drive (D) range, the toroidal continuously variable gear mechanisms 20 and 30 yields high inertia, increasing resistance against rotation of the engine 1 with an effect of lowering fluctuations of rotation of the engine, which restraints vibrations of the vehicle body. In this instance, a change in gear ratio of the toroidal continuously variable gear mechanisms 20 and 30 toward the higher speed side is smaller when the engine 1 is put in the idle-up state in which the engine 1 idles at an increased speed of rotation and causes increased resistance as compared with when the engine 1 is out of the idle-up state, which is desirable for the engine 1 to restrain aggravation of fuel consumption performance. Conversely, the change in gear ratio toward the higher speed side may be increased when the engine 1 is in the idle-up state as compared with when the engine 1 is out of the idle-up state, as a result of which fluctuations of rotation of the engine is more lowered and the vehicle body is more effectively prevented from generating vibrations consequently. Further, a change in gear ratio of the toroidal continuously variable gear mechanisms 20 and 30 toward the higher speed side is larger when the working oil is at temperatures as low as it has high viscosity to admit vibrations as compared with when it is at ordinary temperatures, as a result of which fluctuations of rotation of the engine is more lowered and the vehicle body is more effectively prevented from generating vibrations consequently. However, because, when the working oil is at low temperatures, a rise in viscosity of the working oil imposes increased loading on the engine 1, a change in gear ratio of the toroidal continuously variable gear mechanisms 20 and 30 toward the higher speed side may be smaller when the working oil is at low temperatures as compared with when it is at ordinary temperatures so as to prevent the engine 1 from bearing loading in excess. In the non-drive range, the gear ratio of the toroidal continuously variable gear mechanisms 20 and 30 may be periodically varied so as to cancel fluctuations of engine speed likely in the fluctuation reducing gear ratio control executed in the drive range.

Figure 21:
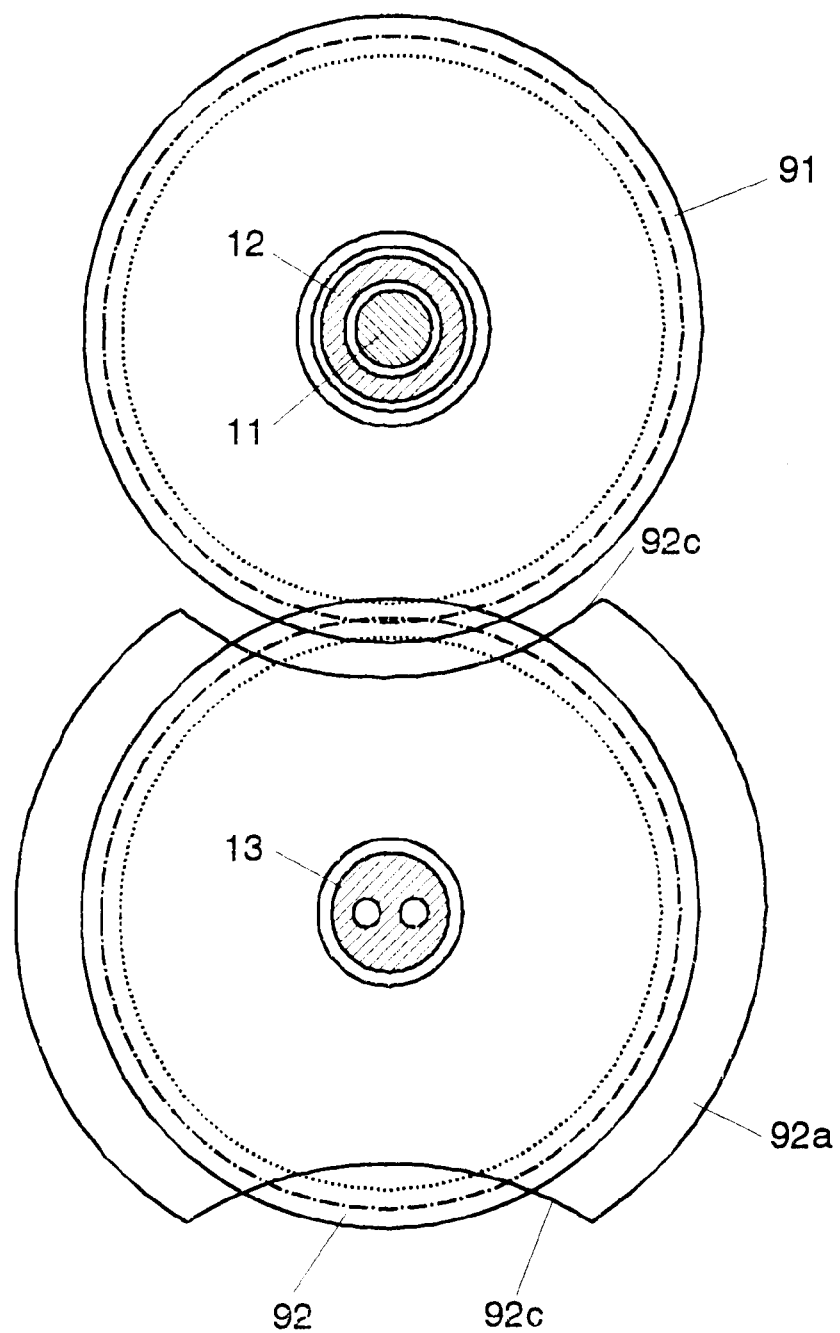
FIG. 21 is an explanatory view showing installation of a massive member for lowering rotational fluctuations to a second gear forming a high mode gear train.

The second gear 92 of the high mode gear train 90 may be provided with a massive disk member 92a such as a flywheel as shown in FIG. 21 to generate inertia so as to lower fluctuations of rotation. In this instance, the disk member 92a is desirably formed with circular-arcuate peripheral cuts 92c in diametrically opposite positions. The disk member 92a formed with the circular-arcuate peripheral cuts 92c permits the first gear 91 to be installed to the second gear 92 from the front with an effect of providing assembling facility.

Figure 17:
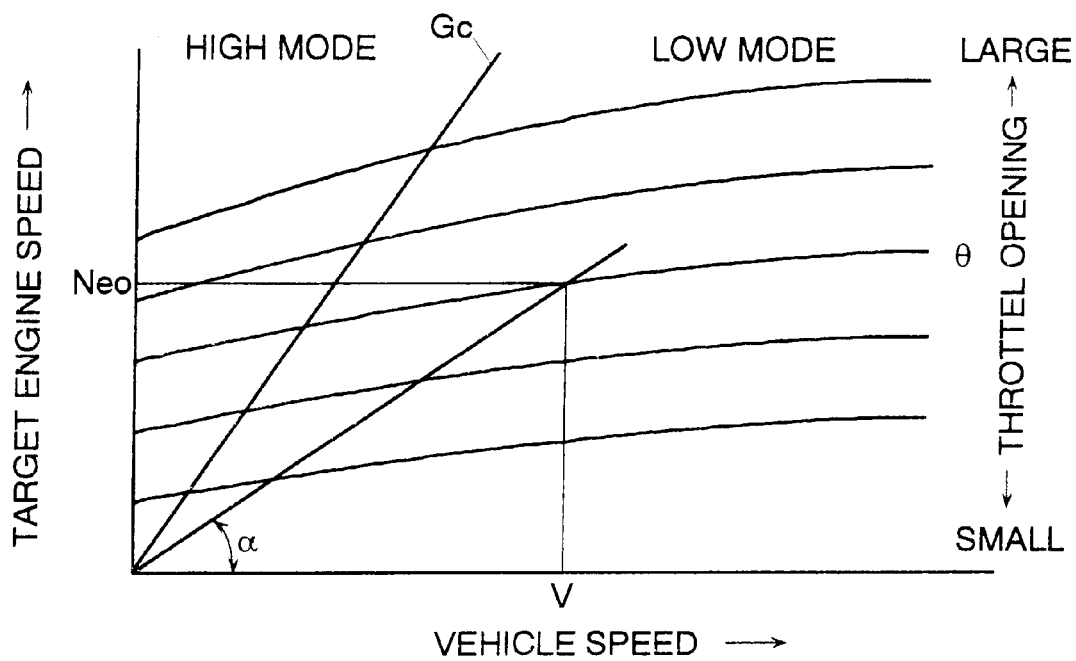
FIG. 17 is a diagrammatic view of an engine speed control map used in gear ratio control.

Referring to FIG. 17 showing a gear ratio control map, the control unit 300 searches an engine speed most suitable for running conditions dictated by vehicle speed and throttle opening and controls the toroidal continuously variable gear mechanisms 20 and 30 to vary a gear ratio based on the characteristic curves shown in FIG. 16. Immediately after starting of the vehicle, the control unit 300 locks the low mode clutch 60 and unlocks the high mode clutch 70 to put the continuously variable transmission 10 in the low mode gear ratio control. When vehicle running conditions change crossing a mode switchover line Z into a high mode zone, the low mode clutch 60 and the high mode clutch 70 are unlocked and locked, respectively, to put the continuously variable transmission 10 in the high mode gear ratio control. Every time vehicle running conditions change crossing the mode switchover line Z between the high and low mode zones, the control unit 300 alternately locks and unlocks the high and low mode clutches 70 and 60. Since the gear ratio control curves L and H for the drive (D) mode dictate the same resultant gear ratio N when running conditions are on the mode switchover line Z, the continuously variable transmission 10 shifts between the high and low mode gear ratio control without causing felt shift shocks.

In many cases, vehicle running conditions change crossing the mode switchover line Z between the high and low mode zones due to stepping on the accelerator pedal with the result of changing vehicle speed or throttle opening. Besides the cases, in the event, while the throttle opening remains unchanged by fixedly stepping on the accelerator pedal, the vehicle runs on a sloping road repeatedly ascending and descending, the mode switchover line Z is crossed due to changes in vehicle speed following changes in slope. Repeated acceleration and deceleration crossing the mode switchover line Z results in frequent switches between high and low modes of gear ratio control in a short period of time, which causes hunting of gear ratio control or hunting of a switch of power transmission paths and lets the driver who holds the accelerator pedal at a fixed position feel frequent unpleasant shift shocks.

In view of the above, the control unit 300 is designed and adapted to perform switchover control of gear ratio control modes which prevents or significantly reduces an occurrence of unpleasant shift shocks.

Figure 22:
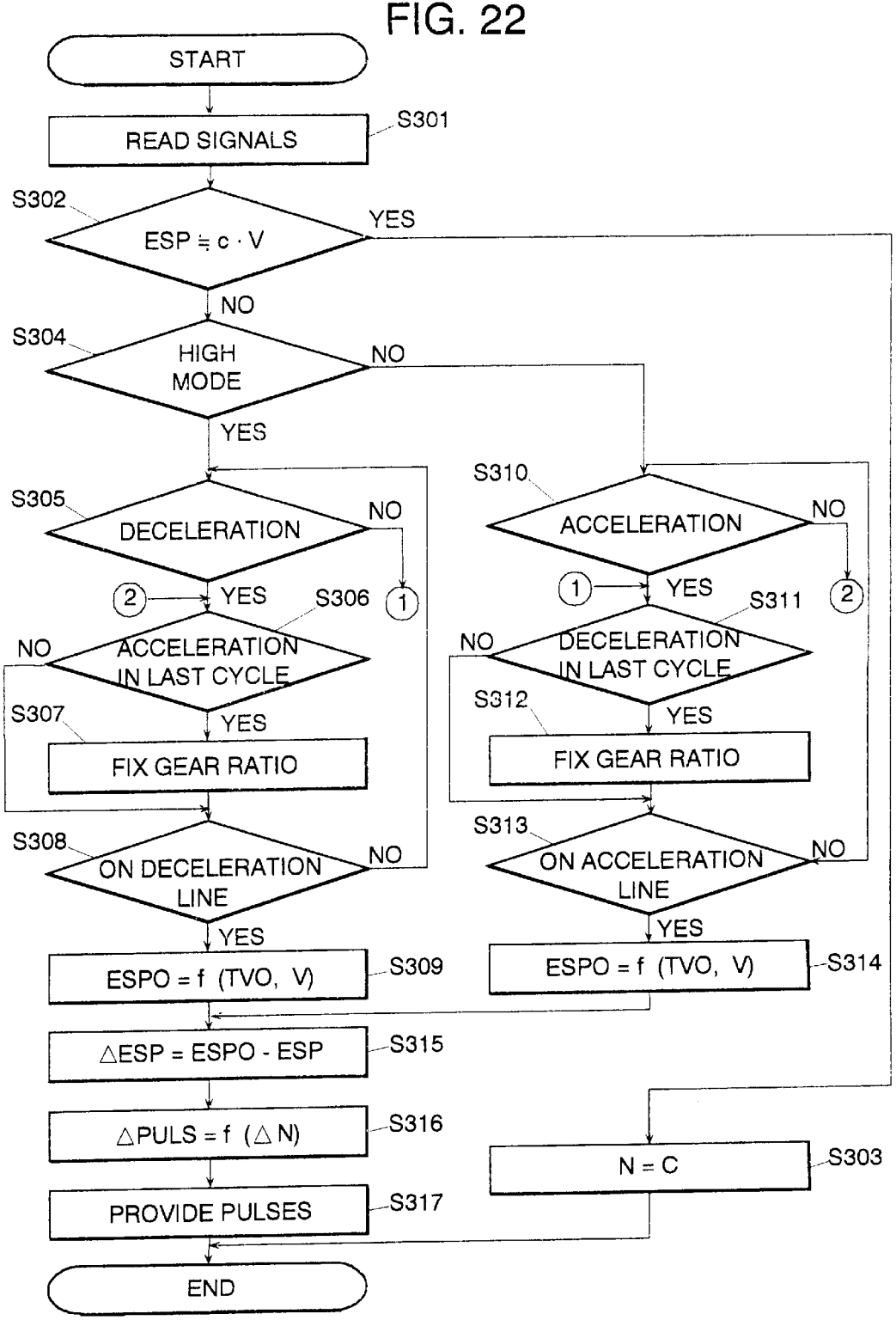
FIG. 22 is a flow chart illustrating a sequence routine of mode changing control for the microprocessor of the control unit.

FIG. 22 is a flow chart illustrating a sequence routine of the gear ratio control mode switchover control for a microprocessor of the control units 300.

When the flow chart logic commences and control proceeds directly to a function block at step S301 where signals from the sensors and switches 301–310 are read in. Subsequently, at step S302, an engine speed ESP transmitted to the continuously variable transmission 10 is compared with a switchover engine speed which is obtained by multiplying a current vehicle speed V by a gear ratio c on the mode switchover line Z to judge whether it is under a switchover of control mode. When the engine speed ESP is approximately equal to the switchover engine speed c·V, this indicates that an alternation of locking and unlocking is in progress between the low and high mode clutches 60 and 70, then a resultant gear ratio N of the continuously variable transmission 10 is fixed at the gear ratio c on the mode switchover line Z at step S303. This is because a predetermined time is necessary to achieve the alternation of locking and unlocking between the low and high mode clutches 60 and 70 and because the running conditions has changed and run off the mode switchover line Z at the achievement of the alternation of locking and unlocking between the low and high mode clutches 60 and 70 which leads to an occurrence of shift shock.

When the engine speed ESP is different from the switchover engine speed c·V, this indicates that the vehicle running conditions have been either in the high mode zone or in the low mode zone, then, a judgement is subsequently made at step S304 as to whether the vehicle running conditions are in the high mode zone. When in the high mode zone, a judgement is made at step S305 as to whether the vehicle is under deceleration. On the other hand, when the vehicle running conditions is in the low mode zone, then, a judgement is subsequently made at step S310 as to whether the vehicle is acceleration. When it is determined at step S305 that the vehicle is under deceleration or it is determined at step S310 that the vehicle is not under acceleration, then another judgement is made at step S306 as to whether the result of the judgement made at step S305 in the last cycle of the sequence routine indicates acceleration. When the answer is affirmative, this indicates that the vehicle turns to deceleration for the first time in this cycle, then, the current gear ratio is fixed at step S307 and maintained until it is judged at step S308 that the vehicle speed V has reached a gear ratio control line for deceleration shown in FIG. 23.

Figure 23:
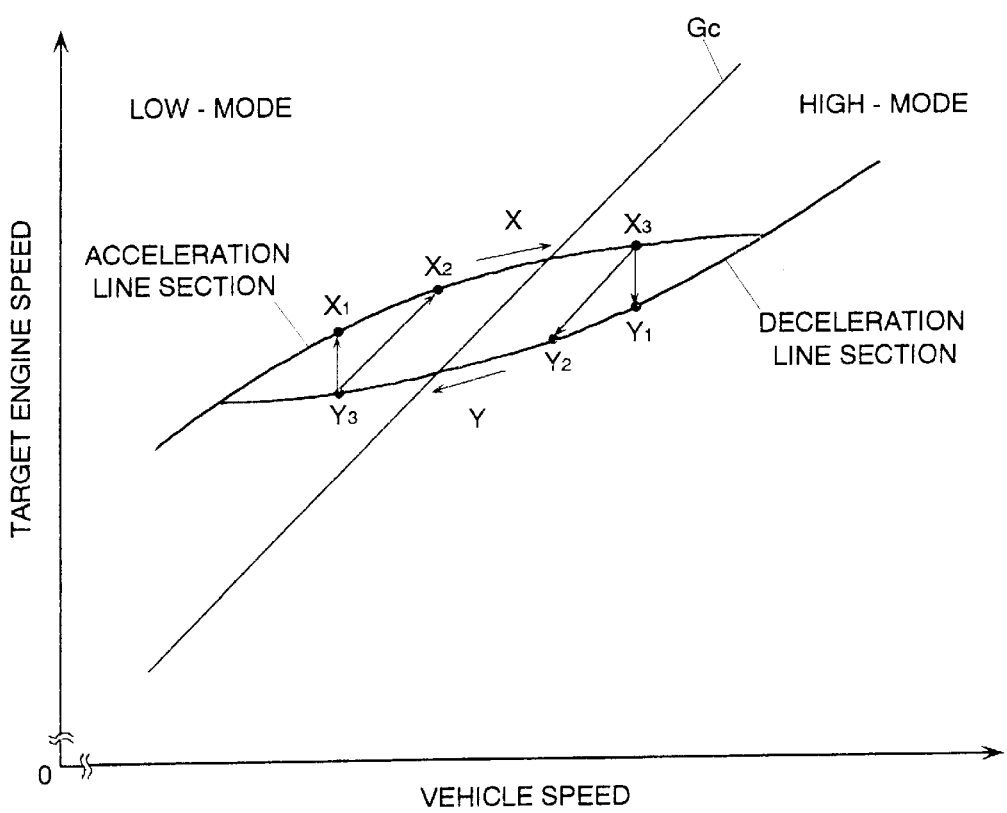
FIG. 23 is an explanatory diagram showing characteristics used in the mode changing control.

FIG. 23 shows one of gear ratio control lines for specific throttle opening of the gear ratio control map shown in FIG. 17. The gear ratio control line includes separate acceleration line section and deceleration line section crossing the mode switchover line Z in a specified band of vehicle speeds. The acceleration line section specifies an engine speed on the high side for a specific vehicle speed, and the deceleration line section specifies an engine speed on the low side for the specific vehicle speed. For example, when the vehicle turns to deceleration due to an external cause such as ascent of the road while accelerating in the high mode zone, the gear ratio control line is changed over from the acceleration line section to the deceleration line section. During the changing of control line, the gear ratio at the beginning of the changing of control line is remained.

As conceptually shown in FIG. 23, when the vehicle turns to deceleration from acceleration, the target engine speed is controlled not to retrace the acceleration line section X toward a point X2 but to jump from the point X3 on the acceleration line section to a point Y2 on the deceleration line section at which the gear ratio is identical with that at the point X3 and follow the deceleration line section Y toward a point Y3. Accordingly, the switchover between the acceleration and deceleration line sections is not accompanied by a sudden change in gear ratio, so as to prevent or significantly reduce a shock due to a change in gear ratio. After waiting achievement of the switchover to the deceleration line section at step S308, a target engine speed ESPO is determined according to the current vehicle speed V and throttle opening TVO at step S309.

On the other hand, when it is determined at step S310 that the vehicle is under acceleration or it is determined at step S305 that the vehicle is not under deceleration, then another judgement is made at step S311 as to whether the result of the judgement made at step S310 in the last cycle of the sequence routine indicates deceleration. When the answer is affirmative, this indicates that the vehicle turns to acceleration for the first time in this cycle, then, the current gear ratio is fixed at step S312 and maintained until it is judged at step S313 that the vehicle speed V has reached the acceleration line section. After waiting achievement of the switchover to the acceleration line section at step S313, a target engine speed ESPO is determined according to the current vehicle speed V and throttle opening TVO at step S314.

After determining a target engine speed ESPO at step S309 or S314, a speed difference $\Delta$ESP of the target engine speed ESPO from the current engine speed ESP is determined at step S315, and a number of drive pulses $\Delta$PLS necessary to remove the speed difference $\Delta$ESP is subsequently determined at step S316. At step S317, the stepping motor is driven with the drive pulses to attain the target engine speed ESPO.

According to the engine speed control map shown in FIG. 23 in which the control line for each throttle opening has acceleration and deceleration line sections, when, while the accelerator pedal remains fixed in a position, the vehicle enter, for example, a descent and is spontaneously accelerated, and, as a result of which as the vehicle changes its speed, the gear ratio control is performed to provide a resultant gear ratio corresponding to the target engine speed changing along the acceleration line section X. After the vehicle speed has crossed the mode switchover line Z into the high mode zone, the high mode gear ratio control takes place. When the vehicle enters an ascent and is spontaneously decelerated, the target engine speed jumps from a point X3 on the acceleration line section X to a point Y2 on the deceleration line section Y. Thereafter the resultant gear ratio is controlled according to the target engine speed changing along the deceleration line section Y. When the vehicle speed crosses the mode switchover line Z into the low mode zone, the low mode gear ratio control takes place. After having entered the low mode zone, when the vehicle further enters a descent and is spontaneously accelerated, the target engine speed jumps from a point Y3 on the deceleration line section Y to a point X2 on the acceleration line section X. Thereafter the resultant gear ratio is controlled according to the target engine speed changing along the acceleration line section X. Consequently, when the vehicle turns between deceleration and acceleration, the changeover of control mode is dragged on by a time necessary to jump from, for example, a point X3 to a point Y2 or from, for example, a point Y3 to a point X2 as compared with a case in which the target engine speed is controlled to trace the acceleration line section X reversely from the point X3 toward X1 or the deceleration line section Y reversely from the point Y1 toward Y3. As a result, hunting of gear ratio control which is accompanied by frequent unpleasant shift shocks is prevented or sufficiently restrained.

In place of fixing a gear ratio at the beginning of switchover between the gear ratio control line sections, the gear ratio may be controlled correspondingly to a target engine speed jumping from a point X3 on the acceleration line section X directly to a point Y1 on the deceleration line section Y or from a point Y3 on the deceleration line section Y directly to a point X1 on the acceleration line section X as shown in FIG. 23. In this instance, while switchover between the gear ratio control line sections is achieved in a short time, it takes a longer time until the target engine speed crosses the mode swichover line Z when it changes from the point Y1 or X1 than when it changes from the point Y2 or X2. Accordingly, hunting of gear ratio control which is accompanied by frequent unpleasant shift shocks is prevented or sufficiently restrained. Further, the acceleration and deceleration line sections of the gear ratio control line are separately provided in a specified band of vehicle speeds in which the mode switchover line exists, the memory of the control unit 300 needs a reduced capacity for the gear ratio control map. If the band of vehicle speeds for the acceleration and deceleration line sections is narrow, the target engine speed changes with a high rate. Accordingly, the band of vehicle speeds is desirably specified in view of the memory capacity.

It is to be understood that although the present invention has been described with regard to preferred embodiments thereof various other embodiments and variants may occur to those skilled in the art, which are within the scope and spirit of the invention, and such other embodiments and variants are intended to be covered by the following claims.

What is claimed is:

1. A control system for a continuously variable transmission disposed between an engine and driving wheels which incorporates a continuously variable gear mechanism for continuously varying a gear ratio between an input speed from said engine and an output speed to said driving wheels according to vehicle running conditions and transmits engine output power to said driving wheels through at least one of a plurality of power transmission paths selectively effected according to vehicle running conditions, said power transmission paths including at least one continuously variable power transmission path which includes said continuously variable gear mechanism, said continuously variable transmission control comprising:

running condition detecting means for detecting vehicle running conditions including at least engine speed and engine loading;

switching means for switching over said power transmission paths from one to said continuously variable power transmission path and vice versa; and control means for actuating said switching means to selectively switch over said power transmission paths from one to said continuously variable power transmission path and vice versa according to a switching control line predetermined with respect to vehicle running conditions including at least vehicle speed, and controlling a gear ratio of said continuously variable gear mechanism according to gear ratio control lines predetermined for specified engine loadings with respect to vehicle running conditions including at least vehicle speed and engine loading;

wherein each said gear ratio control line is partly divided into two separate gear ratio control line sections, one of said two separate sear ratio control line sections being used only during acceleration of said vehicle and another of said two separate gear ratio control line sections being used only during deceleration of said vehicle and said switching control line intersects both said two separate gear ratio control line sections.

2. A control system for a continuously variable transmission as defined in claim 1, wherein said control means causes a switch of gear ratio control between said two gear ratio control line sections when said running condition detecting means detects a turn of running condition of said vehicle between acceleration and deceleration, and maintains a gear ratio of said continuously variable gear mechanism attained at the beginning of said switch of gear ratio control until completing said switch of gear ratio control.

3. A control system for a continuously variable transmission as defined in claim 1, wherein each said gear ratio control line is partly divided into said two separate gear ratio control line sections covering a specified band of vehicle speeds including a specific vehicle speed at which said switching means is actuated to switch said power transmission paths from one to said continuously variable power transmission path and vice versa.

4. A control system for a continuously variable transmission disposed between an engine and driving wheels which incorporates a continuously variable gear mechanism for continuously varying a gear ratio between an input speed from said engine and an output speed to said driving wheels according to vehicle running conditions and transmits engine output power to said driving wheels through at least one of a plurality of power transmission paths selectively effected according to vehicle running conditions, said power transmission paths including at least one continuously variable power transmission path including said continuously variable gear mechanism and at least one non-continuously variable power transmission path omitting said continuously variable gear mechanism, and which is put neutral when both said continuously variable power transmission path and said non-continuously variable power transmission path are effected, said continuously variable transmission control system comprising:

running condition detecting means for detecting vehicle running conditions including at least engine speed and engine loading;

switching means for switching over said power transmission paths between said continuously variable power transmission path and said non-continuously variable power transmission path; and control means for actuating said switching means to selectively switch over said power transmission paths between said continuously variable power transmission path and said non-continuously variable power transmission path according to a switching control line predetermined with respect to vehicle running conditions including at least vehicle speed, and controlling a gear ratio of said continuously variable gear mechanism according to gear ratio control lines predetermined for specified engine loadings with respect to vehicle running conditions including at least vehicle speed and engine loading;

wherein each said gear ratio control line is partly divided into two separate gear ratio control line sections, one of said two separate gear ratio control line sections being used only during acceleration of said vehicle and another of said two separate gear ratio control line sections being used only during deceleration of said vehicle and said switching control line intersects both said two separate gear ratio control line sections.

5. A control system for a continuously variable transmission disposed between an engine and driving wheels which incorporates a toroidal continuously variable gear mechanism comprising an input toroidal disk, an output toroidal disk and a roller disposed between said toroidal input and output disk and continuously varying a gear ratio between an input speed to said input toroidal disk from said engine and an output speed to said driving wheels from said output toroidal disk according to inclinations of said roller determined according to vehicle running conditions and transmits engine output power to said driving wheels through at least one of a plurality of power transmission paths selectively effected according to vehicle running conditions, said power transmission paths including at least one continuously variable power transmission path including said toroidal continuously variable gear mechanism, said control means comprising:

running condition detecting means for detecting vehicle running conditions including at least engine speed and engine loading;

switching means for switching over said power transmission paths from one to said continuously variable power transmission path and vice versa; and control means for actuating said switching means to selectively switch over said power transmission paths from one to said continuously variable power transmission path and vice versa according to a switching control line predetermined with respect to vehicle running conditions including at least vehicle speed, and controlling a gear ratio of said toroidal continuously variable gear mechanism according to gear ratio control lines predetermined for specified engine loadings with respect to vehicle running conditions including at least vehicle speed and engine loading;

wherein each said gear ratio control line is partly divided into two separate gear ratio control line sections, one of said two separate gear ratio control line sections being used only during acceleration of said vehicle and another of said two separate gear ratio control line sections being used only during deceleration of said vehicle and said switching control line intersects both said two separate gear ratio control line sections.

6. A control system for a continuously variable transmission disposed between an engine and driving wheels which incorporates a toroidal continuously variable gear mechanism comprising an input toroidal disk, an output toroidal disk and a roller disposed between said toroidal input and output disk and continuously varying a gear ratio between an input speed to said input toroidal disk from said engine and an output speed to said driving wheels from said output toroidal disk according to inclinations of said roller determined according to vehicle running conditions, transmits engine output power to said driving wheels through at least one of a plurality of power transmission paths selectively effected according to vehicle running conditions, said power transmission paths including at least one continuously variable power transmission path including said toroidal continuously variable gear mechanism and at least one non-continuously variable power transmission path omitting said toroidal continuously variable gear mechanism, and is put neutral while both said continuously variable power transmission path and said non-continuously variable power transmission path are effected, said continuously variable transmission control system comprising:

running condition detecting means for detecting vehicle running conditions including at least engine speed and loading;

switching means for switching over said power transmission paths from one to said continuously variable power transmission path and vice versa; and control means for actuating said switching means to selectively switch over said power transmission paths between said continuously variable power transmission path and said non-continuously variable power transmission path according to a switching control line predetermined with respect to vehicle running conditions including at least vehicle speed, and controlling a sear ratio of said toroidal continuously variable gear mechanism according to gear ratio control lines predetermined for specified engine loadings with respect to vehicle running conditions including at least vehicle speed and engine loading;

wherein each said gear ratio control line is partly divided into two separate gear ratio control line sections, one of said two separate gear ratio control line sections being used only during acceleration of said vehicle and another of said two separate gear ratio control line sections being used only during deceleration of said vehicle and said switching control line intersects both said two separate gear ratio control line sections.

7. A control system for a continuously variable transmission disposed between an engine and driving wheels which incorporates a toroidal continuously variable gear mechanism comprising an input toroidal disk, an output toroidal disk, a roller disposed between said toroidal input and output disks and a support member for supporting said roller for rotation, a hydraulically operated roller actuator for shifting and inclining said roller relative to said input and output toroidal disks through said support member according to hydraulic pressure levels to continuously vary a gear ratio between an input speed to said input toroidal disk from said engine and an output speed to said driving wheels from said output toroidal disk, a shift valve for controlling said hydraulic pressure level supplied to said roller actuator according to vehicle running conditions, friction coupling elements alternately locked and unlocked to switch gear ratio control between a first control mode in which a first power transmission path for transmitting engine output power to said driving wheels is created in said continuously variable transmission and a second control mode in which a second power transmission path, different from said first power transmission path, for transmitting engine output power to said driving wheels is created in said continuously variable transmission, and a switching actuator for alternately locking and unlocking said friction coupling elements according to vehicle running conditions, said continuously variable transmission control system comprising:

a throttle opening sensor for detecting an engine throttle opening of an engine throttle as engine loading;

a vehicle speed sensor for detecting a vehicle running speed;

an engine speed sensor for detecting an engine operating speed; and a controller comprising a microcomputer for determining a target engine speed based on gear ratio control lines predetermined with respect to engine loadings and vehicle speeds based on said engine throttle openings and said vehicle running speed, controlling said shift valve to control said hydraulic pressure level supplied to said roller actuator according to said engine operating speed such that said hydraulically operated roller actuator shifts and inclines said roller to bring said engine operating speed to said target engine speed, and controlling said switching actuator to lock and unlock said friction coupling elements according to a mode switch control line predetermined with respect to engine loadings and vehicle speeds according to said engine throttle opening and said vehicle running speed;

wherein each said gear ratio control line is partly divided into two separate gear ratio control line sections for a specified band of vehicle speeds, one of said two separate gear ration control line sections being used only during acceleration of said vehicle and another of said two separate gear ration control line sections being used only during deceleration of said vehicle and said switching control line intersects both said two separate gear ration control line sections.

8. A control system for a continuously variable transmission disposed between an engine and driving wheels which incorporates a toroidal continuously variable gear mechanism comprising an input toroidal disk, an output toroidal disk, a roller disposed between said toroidal input and output disks and a support member for supporting said roller for rotation, a planetary gear set comprising a pinion carrier connected to an input member through which engine power is transmitted to said toroidal continuously variable gear mechanism, a sun gear connected to said output toroidal disk and an internal gear connected to said driving wheels, a hydraulically operated roller actuator for shifting and inclining said roller relative to said input and output toroidal disks through said support member according to hydraulic pressure levels to continuously vary a gear ratio between an input speed to said input toroidal disk from said engine and an output speed to said driving wheels from said output toroidal disk, a shift valve for controlling said hydraulic pressure level supplied to said roller actuator according to vehicle running conditions, friction coupling elements alternately locked and unlocked to switch gear ratio control between a first control mode in which a first power transmission path including said toroidal continuously variable gear mechanism and said planetary gear mechanism for transmitting engine output power to said driving wheels is created in said continuously variable transmission and a second control mode in which a second power transmission path including said toroidal continuously variable gear mechanism but omitting said planetary gear mechanism for transmitting engine output power to said driving wheels is created in said continuously variable transmission, and a switching actuator for alternately locking and unlocking said friction coupling elements according to vehicle running conditions, said continuously variable transmission control system comprising:

- a throttle opening sensor for detecting an engine throttle opening of an engine throttle as engine loading;
- a vehicle speed sensor for detecting a vehicle running speed;
- an engine speed sensor for detecting an engine operating speed; and
- a controller comprising a microcomputer for determining a target engine speed based on gear ratio control lines predetermined with respect to engine loadings and vehicle speeds based on said engine throttle and said vehicle running speed, controlling said shift valve to control said hydraulic pressure level supplied to said roller actuator according to said engine operating speed such that said hydraulically operated roller actuator shifts and inclines said roller to bring said engine operating speed to said target engine speed, and controlling said switching actuator to lock and unlock said friction coupling elements according to a mode switch control line predetermined with respect to engine loadings and vehicle speeds according to said engine throttle opening and said vehicle running speed;
- wherein each said gear ratio control line is partly divided into two separate gear ratio control line sections for a specified band of vehicle speeds, one of said separate gear ratio control line sections being used only during acceleration of said vehicle and another of said separate gear ratio control line sections being used only during deceleration of said vehicle and said switching control line intersects both said two separate gear ratio control line sections.

9. The continuously variable transmission control system as defined in claim 8, wherein said controller switches control of said shift valve from said gear ratio control line section for acceleration to gear ratio control line said section for deceleration when said vehicle speed sensor detects a turn of said vehicle running speed from acceleration to deceleration and from said gear ratio control line section for deceleration to said gear ratio control line section for acceleration when said vehicle speed sensor detects a turn of said vehicle running speed from deceleration to acceleration, and maintains a gear ratio of said toroidal continuously variable gear mechanism attained at the beginning of said switch of control of said shift valve until completing said switch of control of said shift valve.

* * * * *